US006914095B2

(12) United States Patent
Lorah et al.

(10) Patent No.: US 6,914,095 B2
(45) Date of Patent: Jul. 5, 2005

(54) NANOCOMPOSITE COMPOSITIONS AND METHODS FOR MAKING AND USING SAME

(75) Inventors: Dennis Paul Lorah, Lansdale, PA (US); Robert Victor Slone, Quakertown, PA (US)

(73) Assignee: Rohm and Haas Company, Philadelphia, PA (US)

( * ) Notice: Subject to any disclaimer, the term of this patent is extended or adjusted under 35 U.S.C. 154(b) by 337 days.

(21) Appl. No.: 09/954,135

(22) Filed: Sep. 17, 2001

(65) Prior Publication Data

US 2002/0058740 A1 May 16, 2002

Related U.S. Application Data

(60) Provisional application No. 60/234,263, filed on Sep. 21, 2000, and provisional application No. 60/257,041, filed on Dec. 21, 2000.

(51) Int. Cl.$^7$ ................................................ C08K 3/34
(52) U.S. Cl. ..................... 524/445; 524/446; 524/186
(58) Field of Search .............................. 526/128, 126, 526/548, 348; 501/141, 145; 524/445, 186, 447, 446

(56) References Cited

U.S. PATENT DOCUMENTS

| | | | |
|---|---|---|---|
| 2,531,396 A | 11/1950 | Carter et al. ............... | 260/41.5 |
| 2,883,356 A | 4/1959 | Gluesenkamp ............... | 260/37 |
| 4,739,007 A | 4/1988 | Okada et al. ............... | 524/789 |
| 4,867,902 A | 9/1989 | Russell .................... | 252/186.23 |
| 4,889,885 A | 12/1989 | Usuki et al. ................ | 524/445 |
| 5,032,546 A | 7/1991 | Giannelis et al. ............. | 501/3 |
| 5,279,663 A | 1/1994 | Kaliski ....................... | 106/486 |
| 5,780,376 A | 7/1998 | Gonzales et al. ........... | 501/146 |
| 5,837,763 A | 11/1998 | Ferraro et al. .............. | 524/449 |
| 5,883,173 A | 3/1999 | Elpass et al. ............... | 524/446 |
| 5,936,023 A | 8/1999 | Kato et al. ................... | 524/445 |
| 5,962,553 A | 10/1999 | Ellsworth .................... | 523/216 |
| 5,973,053 A | 10/1999 | Usuki et al. ................ | 524/445 |
| 5,993,769 A | * 11/1999 | Pinnavaia et al. ........... | 423/331 |
| 5,998,528 A | 12/1999 | Tsipursky et al. ........... | 524/445 |
| 6,034,164 A | 3/2000 | Elspass et al. .............. | 524/445 |
| 6,057,035 A | 5/2000 | Singh et al. ................. | 428/403 |
| 2002/0086908 A1 | * 7/2002 | Chou et al. .................... | 516/98 |

FOREIGN PATENT DOCUMENTS

| | | | | |
|---|---|---|---|---|
| EP | 0846662 A2 | 6/1998 | ........... | C01B/33/44 |
| GB | 2314335 | 12/1997 | ........... | C01B/33/34 |
| WO | WO 95/14733 | 6/1995 | ............ | C08K/3/34 |
| WO | WO 97/00910 | 1/1997 | ............ | C08L/7/02 |
| WO | WO 00/29467 | 5/2000 | ............. | C08J/3/20 |

OTHER PUBLICATIONS

Bandyopadhyay, S; Giannelis E. P.; Proceedings of American CHemical Society, pp. 208–209, Mar. 2000.*
Xavier Kornmann, "Synthesis and Characterisation of Thermoset–Clay Nanocomposites", Lulea University of Technology, S–971 87, Lulea, Sweden, pp. 1–29.
Huang, et al., Synthesis and Characterization of PMMA Nanocomposites by Suspension and Emulsion Polymerization, Department of Polymer Science, University of Akron, 2000, pp. A–D.
Lee, et al., "Characterization of Epoxy–Clay Hybrid Composite Prepared by Emulsion Polymerization", Journal of Applied Polymer Science, vol. 68, 1998, pp. 1997–2005.
"Soil Colloids: Their Nature and Practical Signifigance", www.agri.atu.edu/people/Hodgson/Soils/Chapter8.html.
Beall, et al., "Nanocomposites Produced Utilizing A Novel Ion–Dipole Clay Surface Modification", Chemistry and Technology of Polymer Additives, pp. 266–280.
Beall, et al., Nanocomposites Produced Utilizing a Novel Clay Surface Modification, pp. 1–14.
Ron Dagani, "Putting the "Nano" into Composites", C&EN Washington, Jun. 7, 1999, pp. 25–37.
Noh, et al., "Synthesis and Characterization of PS–clay Nanocomposite by Emulsion Polymerization", Polymer Bulletin, 42, (1999), pp. 619–626.
Choi, et al., "Characterization of Emulsion Intercalated Polymer–Na Montmorillonite Nanocomposite", Department of Polymer Science and Engineering, Inha University, Inchon, South Korea, pp. 247–248.
Noh, et al., "Comparison of Characteristics of SAN–MMT Nanocomposites Prepared by Emulsion and Solution of Polymerization", Department of Polymer Science and Engineering, Inha University, Inchon, South Korea, pp. 2811–2819.
Noh, et al. "Intercalation of Styrene–Acrylonitrile Copolymer in Layered Silicate by Emulsion Polymerization", Department of Polymer Science and Engineering, Inha University, Inchon, South Korea, pp. 179–188.
Kim, et al., "Electrorheological Characteristics of Emulsion Polymerized San–Clay Nanocomposite Suspension", Department of Polymer Science and Engineering, Inha University, Inchon, South Korea, pp. 512–513.
"Ion–Exchange Reaction", Encyclopedia Britannica, www.britannica.com/bcom/eb/article/printable /2/0,5722, 118752, 00.html.

* cited by examiner

Primary Examiner—Katarzyna Wyrozebski (57) ABSTRACT

The present invention is directed, in part, to improved nanocomposite compositions and processes for preparing same. In one embodiment, there is provided a process for preparing an aqueous nanocomposite dispersion, wherein the process comprises: providing at least one first ethylenically unsaturated monomer; providing an aqueous clay dispersion comprising an at least partially exfoliated aqueous clay having a first exchangeable cation and, optionally, at least one second ethylenically unsaturated monomer; adding a second cation to said aqueous clay dispersion, wherein at least a portion of the second cation exchanges with at least a portion of the first cation to form a modified aqueous clay dispersion; combining the first ethylenically unsaturated monomer and the modified aqueous clay dispersion; and polymerizing at least a portion of the first or second monomer to form the aqueous nanocomposite dispersion wherein at least one of the first or the second monomers comprises a polar monomer.

25 Claims, 2 Drawing Sheets

FIG. 1

FIG. 2

NANOCOMPOSITE COMPOSITIONS AND METHODS FOR MAKING AND USING SAME

CROSS REFERENCE TO RELATED PATENT APPLICATIONS

This is a non-provisional application of prior pending U.S. provisional applications Ser. Nos. 60/234,263 filed Sep. 21, 2000, and 60/257,041 filed, Dec. 21, 2000.

The present invention relates generally to improved nanocomposite compositions and methods for making and using the same. More particularly, the present invention relates to nanocomposites having improved physical properties. This invention also relates to the use of these improved nanocomposite compositions as, for example, coatings, sealants, caulks, adhesives, and as plastics additives.

One way of improving polymer properties is by adding a clay material to polymers to form composite materials. However, incorporating clays into polymers may not provide a desirable improvement in the physical properties, particularly mechanical properties, of the polymer. This may be due, for example, to the lack of affinity between the clay and the polymer at the interface, or the boundary, between the clay and polymer within the material. In this connection, affinity between the clay and the polymer may improve the physical properties of the resulting nanocomposite by allowing the clay material to uniformly disperse throughout the polymer. The relatively large surface area of the clay, if uniformly dispersed, may provide more interfaces between the clay and polymer, and may subsequently improve the physical properties, by reducing the mobility of the polymer chains at these interfaces. By contrast, a lack of affinity between the clay and polymer may adversely affect the strength of the composition by having pockets of clay concentrated, rather than uniformly dispersed, throughout the polymer. Affinity between clays and polymers is related to the fact that clays, by nature, are generally hydrophillic whereas polymers, such as the polymers used in the aforementioned applications, are generally hydrophobic.

Clay minerals are typically comprised of hydrated aluminum silicates that are fine-grained and have a platy habit. The crystalline structure of a typical clay mineral is a multi-layered structure comprised of combinations of layers of $SiO_4$ tetrahedra that are joined to layers of $AlO(OH)_2$ octahedra. The term "gallery", as used herein, describes the interlayer spaces of the layered clay minerals. The terms "d-spacing" or "basal spacing", as used herein, define the sum of the single layer thickness and the thickness of the interlayer or gallery, which is the repeat unit of the multi-layer mineral. Depending upon the clay mineral, the gallery may contain water and/or other constituents such as potassium, sodium, or calcium cations. Clay minerals vary based upon the combination of their constituent layers and cations. Isomorphic substitution of the cations of clay mineral, such as $Al^{3+}$ or $Fe^{3+}$ substituting for the $Si^{4+}$ ions in the tetrahedral network, or $Al^{3+}$, $Mg^{2+}$ or $Fe^{2+}$ substituting for other cations in the octahedral network, typically occurs and may impart a net negative charge on the clay structure. Naturally occurring elements within the gallery of the clay, such as water molecules or sodium or potassium cations, are attracted to the surface of the clay layers due to this net negative charge.

Nanocomposites are compositions in which at least one of its constituents has one or more dimensions, such as length, width or thickness, in the nanometer size range. The term "nanocomposite", as used herein, denotes the state of matter wherein polymer molecules exist among at least partially exfoliated clay layers. Recently, nanocomposites, that contain layered clay materials such as montmorillonite having silicate layers of a thickness of about 1 nanometer dispersed within a polymeric matrix, have been developed as a means to improve the physical properties of polymers. In order to effectively improve the physical or mechanical properties, the clay is typically uniformly dispersed throughout the polymer in order to promote more interfaces between the clay and polymer and enhance the affinity of the clay to the polymer at these interfaces. Further, if the clay is uniformly dispersed throughout the polymer, less clay material may be added to the nanocomposite composition without adversely affecting the physical properties of the nanocomposite.

Polymer-clay nanocomposites can be characterized as being one of several general types: intercalated nanocomposite, exfoliated nanocomposite, or combinations thereof. The term "intercalated nanocomposite", as used herein, describes a nanocomposite that consists of a regular insertion of the polymer in between the clay layers. The term "exfoliated nanocomposite", as used herein, describes a nanocomposite wherein the 1 nm-thick layers of clay are dispersed in the matrix forming a composite structure on the microscale. The latter type of composite, or exfoliated nanocomposite, maximizes the polymer-clay interactions thereby making the entire surface of the clay layers available for the polymer. This modification may lead to the most dramatic changes in mechanical and physical properties of the resultant polymer. By contrast, the term "conventional composite", as used herein, describes a composite where the clay acts as a conventional filler and is not dispersed on a nano-scale. These composites generally do not enjoy the improvement in mechanical and physical properties seen with exfoliated nanocomposites. In certain embodiments of the present invention, some portion of the clay in the polymer clay nanocomposites may exist as structures larger than exfoliated or intercalated composites.

In order to promote more affinity between the clay and the polymer at the interface and provide a uniform dispersion of the clay within the polymer, the interlayer surface chemistry of the clay may be modified to render the silicate layers less hydrophilic. Previous methods of altering the interlayer surface chemistry of the clay include the use of modifying agents, such as surfactants or silanes, to prepare a clay dispersion prior to its incorporation into a polymer. For example, surfactants may typically comprise a molecule having a hydrophilic functions (which has an affinity to polar media such as water or clay) and an organophilic function (which has an affinity to organic molecules such as oil or polymer). The use of surfactants allows one to disperse clay within a polymer. As used herein, the term "hydrophobically modified clays" denotes clays that may have its surface chemistry modified through the use of an agent such as a surfactant, silane, or other modifier. As used herein, the term "unmodified clays" denotes clays that have not been hydrophobically modified by a modifying agent, or are used in its natural state.

Typical modifying agents used to render a clay less hydrophilic may include, but are not limited to, amino acids, alkylammonium ions, silanes, aminomethylstyrene, or living free radical polymerization initiator ("LFRP"). Further non-limiting examples of other suitable agents for the synthesis of nanocomposites are provided in the reference, M. Ogawa et al., "Preparation of inorganic-organic nanocomposites through intercalation of organoammonium ions into layered silicates", *Bull. Chem. Soc. Jpn.*, 70, 2593–2619 (1997).

Amino acid surfactants are molecules that may consist of a basic amino group (—$NH_2$) and an acidic carboxyl group (—COOH). When introduced into an acidic medium, a proton may be transferred from the —COOH group to the intramolecular —$NH_2$ group. It is believed that a cation exchange occurs between the —$NH_3^+$ functional group that is formed and the naturally occurring cations (i.e., $Na^+$, $K^+$, etc.) present between the clay layers. This results in an intercalated state wherein the —$NH_3^+$ functional groups are "sandwiched" between the individual layers replacing the naturally occurring cation. The term "intercalate", as used herein, refers to incorporating foreign molecules, atoms, or ions in between the layers of the clay material. As a result of this intercalated state, the clay become hydrophobic. Amino acid surfactants are commonly used in the preparation of polyamide 6-clay hybrids because their acid functional group may polymerize with ϵ-caprolactam that is intercalated between the layers. As a result, the intragallery polymerization delaminates the clay in the polymer matrix thereby forming a nanocomposite.

Alkylammonium ion surfactants, such as onium salts, are commonly used to prepare clay dispersions for nanocomposite materials. The basic formula for a typical alkylammonium ion is $CH_3$—$(CH_2)_n$—$NH_3^+$ where n is from 1 to 18. It is believed that the alkylammonium ions also readily exchange with the naturally occurring cations present between the clay platelets resulting in an intercalated state. Further, it is believed that the alkylammonium ions may increase the d-spacing between the clay layers and also may lower the surface energy of the clay thereby allowing organic species with different polarities to become intercalated between the clay layers.

Silanes may also be used in the synthesis of unsaturated polyester-clay nanocomposites. Silanes are a family of organosilicon monomers, which may be characterized by the formula R—$SiX_3$, where R is an organofunctional group, attached to silicon in a hydrolytically stable manner and X designates hydrolyzable groups that may be converted to silanol groups upon hydrolysis. It is believed that silanes interact with inorganic surfaces such as clay that have hydroxyl groups attached primarily to silicon or aluminum thereby forming a bond with the inorganic surface.

Hydrophobically modified clays have been oftentimes used in the preparation of nanocomposite materials. The article, "Synthesis and Characterization of Thermoset-Clay Nanocomposites" by Xavier Kornmann (referred to herein as the "Kornmann") provides some examples for synthesizing nanocomposites using hydrophobically modified clays using in-situ polymerization, melt intercalation, or solution-based polymerization methods. In the in-situ polymerization method, the hydrophobically modified clay, referred to in the article as "organoclay", is swollen in a monomer and then the polymerization reaction is initiated, through the addition of a curing agent or by an increase in temperature, to form the nanocomposite. It is believed that the polymerization reaction leads to the delamination of the clay. In the melt intercalation method, a molten thermoplastic is blended with a hydrophobically modified clay and then annealed at a temperature above the glass transition temperature of the polymer to form the nanocomposite. Lastly, in the solution polymerization method, the hydrophobically modified clay is first swollen in a solvent such as toluene or N,N-dimethylformamide. The polymer is then dissolved into the solvent where it intercalates between the clay layers. The solvent is then removed from the resulting nanocomposite via evaporation.

Kormann also discusses preparing nanocomposites using solution polymerization involving unmodified clays in which the polar solvent is deionized water. However, Kormann does not discuss the addition of a multivalent cation to the aqueous system.

There are significant processing difficulties encountered when preparing nanocomposites in aqueous dispersions using hydrophobically modified clays. In this connection, U.S. Pat. No. 5,883,173 issued to Elspass et al. (hereafter "Elspass") describes a process for preparing single stage rubbery nanocomposite materials by polymerizing or blending latex polymers in the presence of a dispersion of a layered (clay) material. In the aqueous latex processes provided, Elspass discloses that the layered material is dispersed in water with a surfactant such as an onium salt for separating the layers, and then the monomers are polymerized for approximately 46 hours to allow the polymers to intercalate between the layers.

The step of adding a surfactant to exfoliate the layers is time-consuming (e.g., Elspass discloses mixing a clay, surfactant, and monomer slurry for 20 hours, prior to polymerizing for another 26 hours). Moreover, the exfoliated clay dispersions tend to be highly viscous thereby causing processing problems. The processes of the present invention do not require exfoliating the clay with an added surfactant and are accordingly much faster and lower in viscosity than those disclosed by Elspass.

The reference, Huang et al. "Synthesis and Characterization of PMMA Nanocomposites by Suspension and Emulsion Polymerization", Amer. Chem. S. (2000) ("Huang") describes the use of hydrophobically modified clays to form a PMMA nanocomposite via emulsion polymerization. During the emulsion polymerization, the surfactant was used as the emulsifier and the unmodified clay was added after polymerization. The Tg of the resultant nanocomposites are too high to be useful for many of the applications disclosed herein. Further, the nanocomposites are formed by a "melt press" process rather than in an aqueous system.

Another disadvantage of using hydrophobically modified clays is that surfactants, particularly anionic surfactants, used to modify the clay may destabilize polymer latex emulsions. Many of the surfactants, such as onium salts, that are used to disperse clays are also emulsifying agents. In some cases, extreme difficulties may be encountered in the preparation of a stable polymer latex in the presence of such onium salt modified clays. To keep such emulsions stable in the presence of such onium salts, a large quantity of emulsifier is typically required. Larger quantities of emulsifier can degrade properties of the polymer in its final use (e.g., poorer water resistance). Furthermore, large quantities of emulsifier may deleteriously affect the formation of polymer latex particles. Non-uniform polymer latex particle formation may lead to variations in emulsion droplet size resulting in non-uniform polymer particle sizes. Large quantities of emulsifier may also lead to the formation of "secondary particles" which may further broaden the particle size distribution. As well, there are often problems associated with broad particle size distributions such as shear instability of the emulsion, variability in polymer molecular weight (leading to variations in polymer process and properties), and degradation of properties when dried to a powder (e.g., dust resulting from the presence of small polymer particles).

The foregoing problems aggravate the formation of latex polymer particles using emulsion polymerization processes. More particularly, the foregoing problems aggravate the formation of multi-stage latex polymer particles. Examples of multi-stage polymer processes, which are susceptible to these problems, include the preparation of "core-shell" polymer particles and using the gradual monomer addition, or "grad-add" processes.

Still other methods of altering the interlayer surface chemistry of the clay mineral, and consequently improve the affinity of the clay to the polymer, involves the creation of ion-dipoles to foster exfoliation of the clay. The article "Nanocomposites Produced Utilizing a Novel Ion-Dipole Clay Surface Modification." G. W. Beall and S. J. Tsipursky, *Chem. Technol. Polym. Addit.* (1999), Chapter 15, pp 266–280 teaches the use of organic molecules or polymers that possess functional groups having partial negative charges to displace the water molecules within the gallery of a sodium montmorillonite clay. It is believed that the negative charges of these functional groups form an ion-dipole bond with the exchangeable sodium ions on the surface of the clay layer. The presence of these functional groups within the gallery of the clay may aid in the exfoliation of the clay mineral. Alternatively, the clay may remain intercalated with these functional groups and then exfoliated, so that the functional groups may participate in the polymerization reaction. However, for certain purposes it may be undesirable to have these functional groups participate in the polymerization and remain within the structure of the nanocomposite.

U.S. Pat. No. 5,998,528 issued to Tsipursky et al. (hereafter "Tsipursky") discloses the addition of divalent or trivalent cations during or after intercalation of the clay mineral to increase the viscosity of the clay slurry. The clay slurry is blended with one or more polymers, namely water soluble polymers, and an organic solvent to produce a viscous carrier composition. As mentioned earlier, viscous slurries, such as the viscous carrier composition disclosed in Tsipursky, can lead to processing problems in forming the nanocomposite composition. Further, it may be undesirable to introduce solvents into the nanocomposite composition.

The present invention does not require the use of additional polymers, solvents, or other means, to enhance the affinity between the clay and the polymer at the interface and improve the overall mechanical properties of the nanocomposite. It is thus surprising and unexpected that the mechanical properties of nanocomposites may be improved through the addition of a second cation, typically a multivalent cation, that facilitates the ion exchange of a first cation present within the clay contained therein and promotes a greater affinity between the polymer and clay at their interfaces within the nanocomposite composition.

The present invention is directed, in part, to improved nanocomposite compositions and processes for preparing same. Specifically, in one embodiment, there is provided a process for preparing an aqueous nanocomposite dispersion, wherein the process comprises: providing at least one first ethylenically unsaturated monomer; providing an aqueous clay dispersion comprising an at least partially exfoliated aqueous clay and, optionally, at least one second ethylenically unsaturated monomer, wherein said clay has a first exchangeable cation; adding a second cation to said aqueous clay dispersion, wherein at least a portion of the second cation exchanges with at least a portion of the first cation to form a modified aqueous clay dispersion; combining the first ethylenically unsaturated monomer and the modified aqueous clay dispersion; and polymerizing at least a portion of said first or second monomer to form said aqueous nanocomposite dispersion wherein at least one of the first or the second ethylenically unsaturated monomer comprises a polar monomer. In certain embodiments, the first ethylenically unsaturated monomer and the second ethylenically unsaturated monomers are the same monomers. In other embodiments, the first and the second ethylenically unsaturated monomers are different monomers.

These and other aspects of the invention will become more apparent from the following detailed description.

The present invention is directed to processes for improving the physical properties of nanocomposite compositions by enhancing the affinity of the polymer and the clay contained therein. The present nanocomposite compositions may advantageously exhibit an improved balance of properties in comparison to nanocomposite compositions prepared by methods of the prior art. In particular, the nanocomposite compositions of this invention may exhibit improved strength properties, preferably without incurring additional processing steps or without adding additional clay, polymers, or solvents to the composition. The present invention also provides methods for improving a variety of nanocomposite compositions, prepared by emulsion, suspension, solvent, bulk, or other polymerization methods, through the addition of a second, typically a multivalent, cation. The affinity between the polymer and the clay within the nanocomposite composition may be improved regardless of whether the second cation is added prior to or after polymerization of the system.

It has now been found that the addition of a second cation, typically a metal cation, to a nanocomposite composition comprising a polymer and clay containing a first cation, typically a naturally occurring cation, may desirably enhance the affinity between the polymer and clay at their interface. The enhanced affinity between the polymer and clay results in a nancomposite with improved physical properties such as increased tensile strength. Although the present invention is discussed with respect to emulsion-based polymers or aqueous nanocomposite dispersions, it is understood that the methods of the present invention are suitable for a variety of polymerization methods such as, but not limited to, solution or suspension polymerization techniques. Indeed, the present invention is suitable for any polymerization technique in which a partially or completely negatively charged monomer, oligomer, or stabilizer is attracted to the positive charge of the second cation and may be involved in the polymerization.

In certain embodiments of the present invention, the nanocomposite is prepared via an emulsion-based polymerization technique. For example, in connection with the preparation of an aqueous nanocomposite dispersion, two separate aqueous reaction mixtures may be prepared initially which is followed by a multi-stage emulsion polymerization of the monomer within the reaction mixtures. While the present application discusses multi-stage polymerization primarily in terms of two stages, it is understood that more than two stages of polymerization of the monomer is further envisioned. The term "stage", "multi-stage", and "core shell" as used herein, is intended to encompass its broadest possible meaning, such as, for example, the meaning conveyed in U.S. Pat. Nos. 3,793,402, 3,971,835, 5,534,594, and 5,599,854, which disclose various means for achieving "staged" and "multi-staged" polymers. The first aqueous reaction mixture typically comprises a monomer mixture whereas the second aqueous reaction mixture comprises an aqueous clay dispersion and, optionally, a monomer mixture. In certain embodiments, however, the first aqueous reaction mixture may also comprise an aqueous clay dispersion. The term "aqueous nanocomposite dispersion" relates to a clay and polymer nanocomposite that further comprises an aqueous, or water phase. In certain embodiments, the monomer mixture in the first and/or the second aqueous reaction mixtures may be emulsified. In these embodiments, the monomer mixture in the first and the second aqueous reaction mixture may comprise the same monomers or may comprise different monomers. In one embodiment of the present invention, the percent weight of clay to the total amount of monomer within the aqueous nanocomposite dispersion can be in the range of from 0.05% to 20%, preferably from 0.1% to 15%, and more preferably from 0.1% to 10%, and even more preferably from 0.5% to 5%.

The aqueous nanocomposite dispersion contains polymerized units derived from at least one type of ethylenically unsaturated monomer. The term "units derived from", as used herein, refers to polymer molecules that are synthesized according to known polymerization techniques wherein a polymer contains "units derived from" its constituent monomers. Preferably, the ethylenically unsaturated monomer is selected such that the polymerized units within the aqueous nanocomposite dispersion are water insoluble, i.e., have low or no water solubility. By "water-insoluble" it is meant having a water solubility of the monomer no greater than 150 millimoles/liter at 25° C. to 50° C.

The preparation of the monomer mixture typically involves the vigorous mixing of at least one ethylenically unsaturated monomer with water and, optionally, an emulsifier. In other embodiments of the present invention the monomer may be added "neat", i.e., added without water. The amounts of monomer, water, and emulsifier in the monomer mixture may vary depending upon, for example, the particular monomer and/or emulsifier selected, the intended end-use, the polymerization technique, and the like. In certain embodiments, the amount of monomer in the monomer mixture is preferably in the range of from 25 to 100, preferably from 40 to 90, and even more preferably from 60 to 80 weight percent. The amount of water in the monomer mixture, if aqueous based, is preferably in the range of from 0.1 to 75, more preferably from 10 to 60, and even more preferably from 20 to 40 weight percent based on the total weight of the emulsified monomer mixture (e.g., monomers, emulsifier, and water). The amount of emulsifier, if added, in the monomer mixture is preferably in the range of from 0.01 to 10, preferably from 0.05 to 2, and even more preferably from 0.1 to 1 weight percent. In certain embodiments wherein a hydrophobically modified, or surfactant-treated clay is used, the amount of emulsifier within the system may be adjusted, typically to lower amounts, in instances where the surfactant is also an emulsifier.

The monomers which may be polymerized include any of the ethylenically unsaturated monomers commonly known in the art, such as those listed in *The Polymer Handbook, 3rd* Edition, Brandrup and Immergut, Eds., Wiley Interscience, Chapter 2, (1989). Suitable ethylenically unsaturated monomers include, for example, the $C_1$–$C_{18}$ alkyl (meth)acrylate monomers (e.g., methyl-, ethyl-, propyl-, n-butyl-, sec-butyl-, tert-butyl, pentyl-, isobomyl-, hexyl-, heptyl-, n-octyl-, 2-ethylhexyl-, decyl-, undecyl-, dodecyl-, lauryl, cetyl, and stearyl-(meth)acrylate and the like); vinyl aromatic monomers (e.g., styrene, alpha-methyl styrene, para-methyl styrene, chlorostyrene, vinyl toluene, dibromostyrene, tribromostyrene, vinyl naphthalene, isopropenyl naphthalene, divinylbenzene and the like); vinyl esters (e.g., vinyl acetate; vinyl versatate; and the like); vinyl-unsaturated carboxylic acids monomers (e.g., methacrylic acid, acrylic acid, maleic acid, itaconic acid); nitrogen-containing vinyl unsaturated monomers (e.g., acrylonitrile, methacrylonitrile, and $C_1$–$C_{18}$ alkyl (meth)acrylamides, and the like); dienes (e.g., butadiene and isoprene); ethylene, hydroxyethyl(meth)acrylate, hydroxypropyl(meth)acrylate, and the like. The term "alkyl (meth)acrylate", as used herein, refers to both esters of alkyl acrylate and alkyl methacrylate.

For the purposes of preparing nanocomposite compositions having desirable resistance to weathering, it is preferred to use monomers selected from the class of alkyl (meth)acrylates. For the purposes of providing low cost and commercially available aqueous nanocomposite dispersions, it is preferable that the ethylenically unsaturated monomer be selected from the group consisting of $C_1$–$C_{18}$ alkyl methacrylate, $C_1$–$C_{18}$ alkyl acrylate, acrylic acid, methacrylic acid, butadiene, vinylaromatic monomers, and the like. For the purposes of using the aqueous nanocomposite dispersions for preparing coatings and adhesives, it is preferable to use $C_1$–$C_{18}$ alkyl (meth)acrylate monomers; acrylic acid; methacrylic acid; itaconic acid; vinyl acetate; vinyl versatate; vinyl aromatic monomers, and the like. It may be even more preferable to use n-butyl acrylate, ethyl acrylate, butyl methacrylate, methyl methacrylate, styrene, butadiene, acrylic acid, and methacrylic acid monomers for the purpose of providing aqueous nanocomposite dispersions in a variety of applications due to their relatively low cost and commercial availability.

Where it is desirable to covalently crosslink the polymers and/or to graft link multiple stage polymers (e.g., for preparing core-shell two-stage polymer particles), crosslinkers and/or graftlinkers may also be included in the monomer mixtures. The term "crosslinker", as used herein, refers to multi-functional monomers capable of forming two or more covalent bonds between polymer molecules of the same type. The term "graftlinker", as used herein, refers to multi-functional monomers capable of forming two or more covalent bonds between polymer molecules of one type with polymer molecules of another type. Suitable crosslinkers or graftlinkers include, for example, divinyl benzene, butylene glycol dimethacrylate, alkanepolyol-polyacrylates or alkanepolyol-polymethacrylates such as ethylene glycol di(meth)acrylate, butylene glycol diacrylate, oligoethylene glycol diacrylate, oligoethylene glycol dimeth-acrylate, trimethylol-propane diacrylate, trimethylolpropane dimeth-acrylate, trimethylol-propane triacrylate ("TMPTA") or tri-methylolpropane trimethacrylate, and unsaturated carboxylic acid allyl esters such as allyl acrylate, diallyl maleate, and typically allyl methacrylate, and the like.

In certain preferred embodiments, at least one of the monomers within the monomer mixture is a polar monomer. The term "polar monomer", as used herein, describes a monomer with a partially or completely negative charge. Examples of the these monomers include, but are not limited to, monomers containing carboxylic acid, phosphate, or sulfate functional groups. Still further examples of polar monomers are monomers that include hydroxyl, ester, ether, aldehyde and ketone functional groups. Preferably, the polar monomer is a carboxylic acid containing monomer. The term "acid containing monomer", as used herein, refers to any ethylenically unsaturated monomer that contains one or more acid functional groups or functional groups that are capable of forming an acid, such as an anhydride, for example, methacrylic anhydride, maleic anhydride, or itaconic anhydride. Examples of acid containing monomers include, for example, carboxylic acid bearing ethylenically unsaturated monomers such as acrylic acid, methacrylic acid, itaconic acid, maleic acid and fumaric acid; acryloxypropionic acid and (meth)acryloxypropionic acid; sulphonic acid-bearing monomers, such as styrene sulfonic acid, sodium vinyl sulfonate, sulfoethyl acrylate, sulfoethyl methacrylate, ethylmethacrylate-2-sulphonic acid, or 2-acrylamido-2-methylpropane sulphonic acid; phosphoethylmethacrylate; the corresponding salts of the acid containing monomer; or combinations thereof. In other embodiments of the present invention, the polar monomer relates to polar oligomers or unsaturated oligomers, such as trimers, that have a partially or completely negative charge and which have one or more points of unsaturation, such as terminal unsaturation. In certain other embodiments of the present invention, the polar monomer relates to low molecular weight polymeric stabilizers that may be soluble in base (i.e., contain many $CO_2H$ groups and are alkali soluble). Some non-limiting examples of these polar, polymeric stabilizers include MOREZ™ 101 or TAMOL™ 731, both of which are manufactured by Rohm and Haas, Inc. of Philadelphia, Pa. In these embodiments, the amount of polar stabilizer within the system may range from 15 to 50 weight percent.

In certain embodiments, the aqueous clay dispersion, or second reaction mixture, may comprise a monomer mixture of at least one ethylenically unsaturated monomer which is an anionic monomer. Preferably, the anionic monomer is an acid containing monomer. In these embodiments, a portion of the anionic monomer is "staged", i.e., a portion of the anionic monomer, 50% or less, preferably 25% or less, even more preferably 10% or less, is added to the first aqueous reaction mixture containing no clay and the remainder of the anionic monomer is added to the second aqueous reaction mixture. In embodiments involving acid-containing monomers, it is believed that this allows the acid functional groups to equilibrate within the clay galleries and remain there during the polymerization process. The acid containing monomer may aid in lowering the viscosity of the aqueous reaction mixture containing clay and enhance the affinity of the polymer to the clay surface. This staged method of anionic monomer addition may advantageously result in an improvement in physical properties in comparison to a straight addition of the anionic monomer to the first aqueous reaction mixture.

In embodiments where the acid-containing monomer is staged, the amount of acid staged in the second aqueous reaction mixture containing clay can range from greater than 0% to less than 100% of the total acid charged within the aqueous nanocomposite dispersion. The second aqueous reaction mixture may contain from 1% to 50%, preferably 5% to 25%, and even more preferably 5% to 15% of the acid containing monomer within the aqueous nanocomposite dispersion. For those embodiments which utilize higher levels of acid (i.e., 10% or greater of the total monomer within the aqueous nanocomposite dispersion is an acid containing monomer) or for those embodiments that use anionic surfactants for stabilization of the polymer dispersion, a lower percentage of acid containing monomer is incorporated into the second aqueous reaction mixture. The optimal amount of acid containing monomer will vary by the composition of the reaction mixture and the acid type, however, the amount of acid containing monomer will generally be at a level which is equimolar with the CEC of the clay and the amount of divalent (or higher valency) ions, if any, added to the second aqueous reaction mixture. Accordingly, the optimal amount for enhancing the affinity between the polymer and the clay would include one clay acid group, one divalent ion, and one acid containing monomer. The optimal amount will employ only as much acid containing monomer as necessary in the second aqueous reaction mixture to modify the clay with polymer; the remaining amount of acid containing monomer within the first aqueous reaction mixture will then aid in stabilizing the growing polymer/clay nanocomposite particles.

In embodiments where nonionic polymer stabilizers are used, such as for example, alkyl ethoxylated surfactants, the relative amount of acid containing monomer within the second aqueous reaction mixture in comparison to the first aqueous reaction monomer will tend to be a higher percentage of the total amount of acid containing mixture in the nanocomposite. In these embodiments, the acid containing monomer is intended to specifically aid in the intercalation and exfoliation of the clay and not for stabilization of the polymer particle.

In embodiments where the monomer mixture is emulsified, suitable emulsifiers may include, but are not limited to, those conventionally used in emulsion polymerization, such as salts of alkyl-, aryl-, aralkyl-, alkaryl-sulfates or sulfonates; alkyl-, aryl-, aralkyl-, alkaryl-poly(alkoxyalkyl) ethers; alkyl-, aryl-, aralkyl-, alkaryl-poly(alkoxyalkyl)sulfates; alkali salts of long-chain fatty acids such as potassium oleate, typically alkyl diphenyloxide disulfonate; and the like. The preferred emulsifiers may include, for example, dodecyl benzene sulfonate and dioctyl sulfosuccinate.

The second aqueous reaction mixture comprises an aqueous clay dispersion. The aqueous clay dispersions include at least 0.05, typically from 0.1 to 20, more typically from 0.1 to 15, even more typically from 0.1 to 10, and most typically from 0.5 to 5 weight percent of clay based upon the weight of the monomer in the aqueous nanocomposite dispersion. The amount of water present in the aqueous clay dispersion is from 70 to almost 100 weight percent. In certain embodiments, the aqueous clay dispersion may also include a monomer mixture comprising at least one ethylenically unsaturated monomer, such as the monomers disclosed herein. Preferably, at least one of the ethylenically unsaturated monomers within the mixture is a polar monomer. In embodiments wherein a monomer mixture is added to the aqueous clay dispersion, the weight percentage of the monomer within the aqueous clay dispersion may be from 0.01% to 100% by weight.

In certain embodiments of the present invention, the weight percentage of the clay in the aqueous phase may decrease as it becomes incorporated into the nanocomposite/polymer phase of the aqueous nanocomposite dispersion. This decrease in clay concentration may occur during the polymerization step(s) as the polymers form and incorporate the clay (i.e., exfoliated clay layers and/or non-exfoliated clay particles) into the nanocomposite particles.

Suitable clays for the aqueous clay dispersion includes any natural or synthetic layered mineral capable of being intercalated or exfoliated. Examples of such clays may include, for example, layered silicate minerals. The layered silicate minerals that may be employed include natural and synthetic minerals capable of forming intercalation compounds. Examples of some naturally occurring minerals include, but are not limited to those known as, smectite, phyllosilicate, montmorillonite, saponite, beidellite, montronite, hectorite, stevensite, vermiculite, kaolinite and hallosite. Preferably among these minerals is montmorillonite. Some non-limiting examples of synthetic minerals, or synthetic phyllosilicates, may include LAPONITE®, which is manufactured by Laporte Industries, Ltd. of Charlotte, N.C., magadiite, and fluorohectorite.

Clays typically have at least one naturally occurring cation, or first cation, such as potassium, calcium, or sodium, present within their galleries that are attracted to the net negative charge of the clay surface. For example, clays like montmorillonite may be mined with a naturally occurring or first cation such as sodium or calcium. The terms "sodium form" or "calcium form" refer to clays that have a first cation which is sodium or calcium, respectively.

The cationic exchange capacity ("CEC") of the clay relates to the ion exchange capacity of the clay, or the total quantity of positive charge that can be absorbed onto the clay surface, expressed in terms of positive charges per unit mass of colloidal particles. Some CEC values for exemplary clay materials are as follows: montmorillonite clays range from 70 to 150 meq/100 g; hallosite clays range from 40 to 50 meq/100 g; and kaolinite clays ranges from 1 to 10 meq/100 g. In certain embodiments of the present invention, the clays selected preferably have higher CEC values. In preferred form, clays used in the present invention may have a CEC capacity of about 40 meq/100 g or greater, preferably a CEC capacity of about 70 meq/100 g or greater, more preferably a CEC capacity of about 90 meq/100 g or greater, and even more preferably a CEC capacity of 100 meq/100 g or greater. In certain embodiments of the present invention, the CEC capacity of the clay may be increased, which enhances the affinity of the clay to the polymer within the nanocomposite dispersion, by electrochemically reducing the clay prior to the polymerization of at least a portion of the monomer.

In the present invention, the clays within the aqueous clay dispersion may be either partially or completely exfoliated. Preferably, the clay is an at least partially exfoliated clay. The term "at least partially exfoliated clay", as used herein, generally refers to clay in which the layers have been completely or partially separated from one another. By contrast, the term "non-exfoliated clay" generally refers to the physical state of clay which does not exist as separated layers. The term "intercalated" generally refers to the state where polymers are interposed between the layers of the clay within the system. The term "partially intercalated" generally refers to the state wherein some of the clay layers within the system have polymer in between the layers and other clay layers do not. Any of the various states of polymer and clay systems may be used in the present invention.

Typically, the aqueous dispersions of completely ("fully") exfoliated clay are quite viscous and/or gelatinous at clay concentrations greater than a few percent. It should be appreciated to those skilled in the art that the exact weight percent (concentration) of clay which forms such a highly viscous gel depends on a number of factors, including but not limited to clay type, temperature, pH, and the like. Typically, the clay dispersion forms a free-flowing liquid rather than a viscous gel.

In the present invention, limiting the degree of exfoliation to less than 100% complete, i.e. partial exfoliation (less than 100%) typically provides clay dispersions that have reduced viscosities and/or a non-gelled liquid state. Hence, the portion of the clay that is exfoliated into clay layers typically provides the major contribution to viscosity increase while the non-exfoliated portion (i.e., clay particles) provides a minor contribution to the viscosity increase. Accordingly, the total amount of partially exfoliated clay in a aqueous clay dispersion is typically less than about a few percent by weight, preferably 5% or less, more preferably 4% or less, and even more preferably 3% or less, based on the total weight of the dispersion. Further exfoliation of the clay may take place during subsequent processing, such as in the step of emulsion polymerization. It is contemplated that the reduction of viscosity of the aqueous clay dispersion may be aided by dispersants, such as, but not limited to polyphosphates. These may be added during the polyermization process or to the polymerized product.

Often, moderate mechanical mixing not requiring high shear may be suitable to provide dispersions of an at least partially exfoliated clay in water. When fully exfoliated clays cause processing problems associated with the presence of high viscosities and/or gels in the reaction media, the degree of exfoliation should be less than complete. Likewise, to achieve the desired chemical and physical properties, the clay should be at least partially exfoliated. As well, the step of shearing clays in an aqueous environment typically results in a viscosity increase of the aqueous environment. Usually, the greater the degree of exfoliation the greater the increase in viscosity.

Besides increasing the degree of exfoliation of the clay, increasing the clay concentration within the aqueous nanocomposite dispersion may also result in increased viscosities. To this end, viscosity may be controlled by dilution of the reaction media and/or clay dispersion by a suitable liquid, such as water. Typically, it may be desirable to control the viscosity of reaction media and/or clay dispersion by dilution prior to the polymerization step(s). For example, to obtain a high level of clay enrichment in the nanocomposites of the present invention (e.g., clay amounts greater than 5% based on total weight polymer within the aqueous nanocomposite dispersion), the reaction media may be diluted with a sufficient amount of water prior to subsequent polymerization steps to reduce the viscosity. The amount of dilution that is necessary to achieve a particular viscosity level may be readily determined by those skilled in the art. Typically, to obtain a sufficient viscosity range prior to adding subsequent reactants, the solids concentration of the reaction media may be controlled to less than 50%, typically between 10% and 40%, and even more typically to between 20% and 30%. In certain embodiments, the viscosity of the aqueous dispersion prior to adding the reactants may range up to 5,000 centipoises ("cps") using a Brookfield Viscometer and measured using a number 3 spindle at 60 revolutions per minute ("rpm").

Aqueous clay dispersions may be prepared by subjecting an aqueous clay mixture comprising at least one unmodified clay to shearing forces such as by mechanical mixing to partially and/or fully exfoliate the clay. Various high shearing methods to disrupt the physical integrity of clay particles in water to at least partially exfoliate the clay without requiring a modifying agent such as a surfactant are also envisioned. These methods include, but are not limited to, ultrasonication, megasonication, grinding/milling, high speed blending, homogenization, and the like. The aqueous clay dispersion may also be subjected to shearing forces at temperatures which range from 10 to 150° C., preferably from 20 to 100° C., and more preferably from 20 to 90° C. to further aid in exfoliating the clay layers. Although such high shearing methods may be used in the process of the present invention, these methods are not required to achieve an at least partially exfoliated state. In the various embodiments of this invention, the clay may include both exfoliated clay layers and non-exfoliated clay particles. In certain embodiments of the present invention, homogenization of the clay dispersion is not required. Indeed, in certain embodiments of the present invention, depending upon the amount of the clay within the dispersion, homogenization may not be necessary to provide the desired improvements in physical properties such as tensile strength.

Hydrophobically modified may also be used with the methods of the present invention. In certain embodiments of the present invention, the clays may be at least partially hydrophobically modified. As mentioned earlier, modifying agents such as surfactants modify the surface chemistry of the clays, for example, by ion exchanging with the naturally occurring cations present within the clay. This results in an "intercalated" state wherein the surfactant is "sandwiched" between the individual layers replacing the naturally occurring cation. Exemplary surfactants may include anionic, cationic, or nonionic surfactants having a hydrophilic head group and at least one oleophilic tail wherein the tails are selected from hydrogen and alkyl, alkenyl, and alkynyl groups having about 4 to about 30 carbon atoms. Preferably, the surfactant used with the methods of the present invention are cationic surfactants. The term "cationic surfactant", as used herein, describes surfactants wherein the hydrophobic or hydrophillic moiety, preferably hydrophillic, carries a positive charge when dissolved in an aqueous media. Representative cationic surfactants may include onium salts such as, for example, salts comprising quaternary ammonium, quatenary phosphonium, or tertiary sulfonium cations or aliphatic mono-, di-, and polyamines derived from fatty and rosin acids. In the representative surfactants provided, the positive charge generally resides on an amino or quaternary nitrogen.

As mentioned earlier, the clay material present within the nanocomposite dispersion, or the clay dispersion contained therein, includes a first cation residing between the clay layers. Alternatively, the first cation may be present as counter-ion to the anion within the surfactant. This first cation may comprise naturally occurring cations that are present within the galleries of the clay mineral, such as sodium, potassium, or calcium cations, and/or surfactants, preferably cationic surfactants. For example, the first cation may preferably comprise from 0 to 20%, by dry weight percent of the clay, or more preferably from 0 to 50%, dry cation. In certain preferred embodiments, the sodium hydrophobically modified clay is more preferred.

A second cation, preferably a multivalent cation, more preferably at least one divalent or trivalent cation, and even more preferably at least one divalent or trivalent metal cation such as but not limited to Ca, Mg, Cu, Mg, Fe, or Zr, is added to the aqueous nanocomposite dispersion or clay dispersion. Preferably, the second cation does not comprise an onium cation or a cationic surfactant. The addition of the second cation to the aqueous clay dispersion results in a modified aqueous clay dispersion. The addition of the second cation to the aqueous nanocomposite dispersion results in an in situ modified clay. The cation is preferably soluble, i.e., is present at a level such that all of the cation may dissolve in a solvent. In preferred embodiments, the solvent is water and the cation is water soluble.

The second cation may preferably be added in the form of a slurry or solution. In certain embodiments of the present invention, the second cation is added in the form of a solution containing a metal salt comprising at least one divalent and/or trivalent cations. Preferably, the metal salt is dissolved in water or other solvent. Examples of such metal salts include, but are not limited to, $Ca(OH)_2$, $Mg(OH)_2$, or $Mg(SO_4)$. Further non-limiting examples of metal salts, comprising divalent or trivalent cations, are provided in U.S. Pat. No. 5,998,538. The selection of the second cation is influenced by the final use of the nanocomposite whereas the selection of the anion may influence the solubility. The amount of the second cation that is added to the aqueous nanocomposite or clay dispersion ranges from 0.001 to 10 weight percent, more preferably from 0.01 to 5 weight percent, and even more preferably from 0.1 to 1 weight percent, based upon the dry weight of the clay within the nanocomposite or clay dispersion. Elevated temperatures are preferred to favor the exchange of the second cation with the first exchangeable cation. However, the second cation may exchange with the first exchangeable cation at room temperature, i.e. temperatures of 25° C. or greater.

In accordance with the present invention, at least a portion of the second cation effectively ion exchanges with at least a portion of the first cation. The second cation does not need to completely exchange with the first cation. The degree of exchange may be determined, for example, in a latex by isolating the polymer from the aqueous phase and analyzing the aqueous phase by standard techniques, such as, for example, quantitative atomic absorption.

The selection of the second cation to be added to the nanocomposite system or clay dispersion is dependent, for example, upon the desired properties or intended end use. Preferably, at least a portion of the second cation should differ from at least a portion of the first cation to effectively ion exchange. For example, in a system where the first ion cations comprise sodium, calcium, and cationic surfactant, a divalent cation, such as calcium, will typically exchange first with the sodium cation and next with the cationic surfactant. The first calcium cation is not expected to exchange with the second calcium cation but rather reaches an equilibrium state; therefore if the first cation is completely comprised of calcium no exchange will be evident. For example, the reference "Ion Exchange Interaction of Quaternary Alkylammmonium Cations with Sodium and Calcium Forms of Montmorillonite", A. I. Zhukova et al., Ukr. Khim. Zh., 1975, 41(7), 696–699, describes that the naturally occurring calcium cation in the montmorillonite clay is bonded more firmly than the surfactant cations, $Me_4N^+$ or $BuNH_3^+$. The rate of ion exchange varies depending upon a variety of factors such as the relative amounts of first and second cations within the system, the relative sizes of the cations to be exchanged, and/or the amount of water molecules present within the galleries. Since the exchange of the first and second cation is reversible, in certain preferred embodiments of the present reaction, the forward reaction, or the exchange of the second cation for the first cation, preferably occurs rather than the reverse reaction.

The second cation may be added to the clay dispersion at any point during or after the polymerization process to enhance the affinity of the polymer to the clay within the system and improve the physical properties of the nanocomposite. Preferably, the second cation may be added to the aqueous clay dispersion prior to or during the polymerization of monomer to form the nanocomposite dispersion. This mode of addition typically results in greater improvements in the physical properties of the nanocomposite compared with adding the second cation after polymerization. Improved properties may also be seen if the second cation exchanges with the first exchangeable cation in the presence of a non-ionic surfactant such as soap, calcium hydroxide, or water. The presence of the non-ionic surfactant seems to enhance the degree of exchange of the second cation with the first exchangeable cation and the resultant physical properties such as tensile strength of the nanocomposite.

The modified aqueous clay nanocomposite dispersion, or the aqueous clay dispersion in which the second cation has been added, may exhibit a lower viscosity than the aqueous nanocomposite dispersion without such modification. Depending upon the composition of the nanocomposite dispersion, the reduction of viscosity may be an order of magnitude, i.e., thousands of centipoise to hundreds of centipoise. This reduction of viscosity may be attributable to the attraction of the negative portion of the polymer to the exchanged cations on the clay surface.

In certain preferred embodiments of the present invention, there is provided a process for preparing an aqueous nanocomposite clay-polymer dispersion, wherein the process comprises: providing at least one first ethylenically unsaturated monomer; providing an aqueous clay dispersion comprising an at least partially exfoliated aqueous clay and, optionally, at least one second ethylenically unsaturated monomer, wherein said clay has a first exchangeable cation; adding a second cation to said aqueous clay dispersion, wherein at least a portion of the second cation exchanges with at least a portion of the first cation to form a modified aqueous clay dispersion; combining the first ethylenically unsaturated monomer and the modified aqueous clay dispersion; and polymerizing said first and/or second monomer to form said aqueous clay polymer nanocomposite dispersion wherein at least one of the first or the second ethylenically unsaturated monomer comprises a polar monomer. In certain embodiments, the monomer in the nanocomposite dispersion is polymerized after the adding step. These steps may be performed in a variety of different orders. For example, in one embodiment, the second providing step and the adding step may be performed either prior to or after the polymerizing step.

In the third step of one embodiment of the present invention, the first and second aqueous reaction mixtures, or aqueous mixture and aqueous clay dispersion, are multistage emulsion polymerized. Such multi-stage emulsion polymerization preferably involves the sequential polymerization of two or more monomer mixtures wherein the monomers of the first monomer mixture are polymerized to more than 80%, preferably more than 90%, and even more preferably more than 95% degree of conversion to form a polymer particle dispersion. This polymerization is preferably followed by the polymerization of a second monomer mixture containing the clay dispersion in the presence of the polymer particle dispersion to form additional polymers which may associate with the polymer particles (e.g., polymer shells around or domains within the polymer particles) and/or form additional polymer particles.

In another aspect of the present invention, an aqueous dispersion may be prepared by a multistage emulsion polymerization process, in which at least two stages that differ in composition are polymerized in sequential fashion. Such a process usually results in the formation of at least two mutually incompatible polymer compositions, thereby resulting in the formation of at least two phases within the polymer particles in the aqueous nancomposite dispersion. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged emulsion polymers within the aqueous nancomposite dispersion may contain the same monomers, surfactants, redox initiation system, chain transfer agents, etc. as disclosed herein-above for the emulsion polymer. The polymerization techniques used to prepare such multistage emulsion polymers are well known in the art such as, for example, U.S. Pat. Nos. 4,325,856; 4,654,397; and 4,814,373.

During this step, it should be appreciated that the first and second aqueous reactions mixtures may be multi-stage polymerized in either order. For preparing nanocomposite compositions in the form of dry powders it is preferable that the monomer(s) within the clay-containing mixture, or second aqueous reaction mixture, is polymerized after the monomer(s) within the first aqueous reaction mixture.

In one embodiment of the present invention, the clay may be at least partially exfoliated during polymerization of the monomers in the second reaction mixture which contains the monomer and clay. In this embodiment, the clay/monomer mixture may be the first stage of the multi-stage polymerization so that the inner polymer core portion of the multi-stage polymer will preferably contain at least a portion of the clay. In another embodiment, this clay/monomer mixture may be the second stage of the multi-stage polymerization so that the outer polymer shell portion of the multi-stage polymer will typically contain at least a portion of the clay. In further embodiments both stages may contain the clay.

The emulsion polymerization step is typically carried out in a suitable reactor wherein the reactants (monomers, initiators, optional emulsifiers, aqueous clay dispersion, and optional chain transfer agents) are suitably combined, mixed, and reacted in an aqueous medium, and wherein heat may be transferred into, and away from, the reactor. The reactants are preferably added slowly (gradually, as in a semi-batch process) over time, continuously, or quickly as a "shot" (batchwise) into the reactor. Typically, the reactants are gradually added ("grad-add") to the reactor.

In other embodiments of the present invention, the nanocomposite dispersions of the present invention may be polymerized through techniques other than emulsion polymerization. For example, the nanocomposite dispersions may be polymerized via bulk polymerization techniques, i.e., polymerization without added solvents or water. In other embodiments, solution polymerization techniques may be used if the heat of polymerization of the monomer or the viscosity of polymer is too high. Preferably, the polymerization occurs in an aqueous medium but other mediums, or solvents, may be used. However, some disadvantages with solution polymerization may be removal of the solvent at the completion of the reaction or chain transfer reactions with the solvent which may limit molecular weight.

In other embodiments of the present invention, the monomer within the nanocomposite may be polymerized by suspension polymerization. In these embodiments, the monomer is mechanically dispersed in a liquid medium, preferably water, and is polymerized as droplets.

Various initiator systems are known in the art of free radical initiation and may be used in the methods described herein. The selection of the initiator system may vary depending upon the polymerization technique used. A thermal initiator, such as, but not limited to, a persulfate salt may be used. Alternatively, a free radical redox initiator system may also be employed. Examples of such systems include, for example, an oxidizing agent or oxidant such as a persulphate, azo, peroxide (e.g., hydrogen peroxide, t-butyl hydroperoxide, t-amylhydroperoxide), and the like in combination with a reducing agent or reductant such as sodium metabisulphite, sodium bisulfite, sodium sulfoxylate formaldehyde, sodium dithionite, isoascorbic acid, sodium hydrosulphite, 2-hydroxy-2-sulfinatoacetic acid, 2-hydroxysulfonatoacectic acid, and the like.

The free-radical initiators which are typically used in the various steps of the process are those conventionally utilized in free-radical redox polymerizations conducted in the temperature range from 10° C. to 100° C., preferably from 20° C. to 95° C., and more preferably from 55° C. and 90° C. Temperatures higher than 100° C. are possible using equipment that is designed for elevated pressures. In some embodiments involving redox initiation, initiation temperatures are preferably kept below 85° C., more preferably below 55° C. for redox initiation. In other embodiments involving thermal initiation with persulfate salts, temperatures in the range 80° C. to 90° C. are used.

In certain embodiments, the present invention may use a redox process to initiate the modification of the clay surface and to aid in the polymerization of the monomer between the layers of the clay. A relatively large percentage of the weight of clay, typically 2% by weight or greater, comprises redox-active multivalent metal ions such as iron, copper, manganese, and the like, that are present within the galleries and/or the surface layers of the clay. These redox-active multivalent metal ions, inherent within the clay or added to the system, may be used to accelerate radical generation from redox-active initiator components. In the redox process, a clay containing metal ions such as $Fe^{II}$ or $Fe^{III}$ may be reacted in the presence of either an oxidant or a reductant, respectively, to form radicals. Redox-derived radicals will be formed in the spaces between the clay layers or at the clay surface and foster intercalation and/or exfoliation of the clay. Further, redox processes may generate polymer clay nanocomposites that exhibit higher degrees of film clarity than without redox.

In the redox process wherein a clay with $Fe^{II}$ is reacted in the presence of an oxidant, a chemical reductant is added to an aqueous reaction mixture containing clay in its natural $Fe^{III}$ form and, optionally, a surfactant. Preferably, the amount of reductant added is in a sufficient quantity to reduce every mole of iron contained within the clay. Confirmation of the reduction of the clay from its $Fe^{III}$ to $Fe^{II}$ form may be made by observing a color change of the aqueous reaction mixture. The aqueous reaction mixture may become gray/green in appearance. Once the iron has been reduced, a chemical oxidant is added to the aqueous reaction mixture along with one or more monomers. The interaction of $Fe^{II}$ with the oxidants causes an electrochemical reaction which results in the transfer of electrons from the iron associated with the clay to the oxidant. Reduction of the oxidant causes the oxidant to split into an anion and a redox derived radical which can then initiate polymer chains either at the surface of the clay or in the gallery space between clay layers. In this manner, the redox initiation system can be helpful in the intercalation and/or exfoliation of a polymer/clay nanocomposite. This redox process may be used to initiate the polymerization and/or sustain the polymerization throughout the entire nanocomposite formation. In addition, the redox process may be used to alter the CEC value of the clay.

In an alternative embodiment, a $Fe^{III}$ form clay is reacted in the presence of a reductant and a monomer emulsion seed is added to an aqueous reaction mixture containing clay in its natural $Fe^{III}$ form. The reductant interacts with the $Fe^{III}$ groups of the clay and is oxidized which can cause radical formation and subsequent polymer chain initiation at or near the surface of the clay. Once the seed formation is complete, the nanocomposite latex is formed according to the standard methods disclosed herein. This redox process may also be used to initiate the polymerization and/or sustain the polymerization throughout the entire nanocomposite formation. In addition, the redox process may be used to alter the CEC value of the clay.

In certain embodiments wherein the redox system is the sole source of radicals, polymer chain growth may continue to be confined to regions near the clay surface to the extent that the iron is confined either to the clay plates or to the exchange spaces on the surface of the clay. The use of a reductant (such as sodium sulfoxylate formaldehyde, isoascorbic acid, and the like) and oxidant (such as ammonium persulfate, hydrogen peroxide, tert-butyl hydroperoxide, and the like) along with redox-active multivalent metal ions found in the clay or added separately is also a useful method for preparing the polymer/clay nanocomposites of the present invention.

In one embodiment of the present invention, the monomers may be added batch-wise ("shot") or fed continuously over time into the reactor. Continuous feeding by gradual addition of the aqueous reaction mixtures into the reactor over times from 0.5 to 18 hours, preferably from 1 to 12 hours, and even more preferably from 2 to 6 hours, is useful for controlling reaction temperature.

Buffers may also be present in the reaction mixture during an emulsion polymerization. Buffers are generally the salts of weak acids such as, but not limited to, sodium bicarbonate, sodium carbonate or sodium acetate. The amount of buffer that may be present, if added, in the reaction mixture may range from 0.01 to 5 weight percent based upon the total monomer utilized in the polymerization. Generally lower levels of a strong base, such as ammonia or sodium hydroxide, can also be used to control the pH of the polymerization. These agents may be added at any time either before, during, or after the polymerization step. Buffers may be further used to control hydrolysis of certain monomers, influence the extent of premature crosslinking during polymerization (as in the case when N-methylolacrylamide monomer is employed), influence the rate of decomposition of initiators, and/or affect the extent of dissociation of carboxylate acid monomers and surfactants to control colloidal stability.

Optionally, at least one chain transfer agent may be incorporated during polymerization to control the molecular weight of the polymer. Examples of chain transfer agents include, but are not limited to, mercaptans, polymercaptans, and polyhalogen compounds. Further, non-limiting examples of chain transfer agents include alkyl mercaptans such as ethyl mercaptan, n-propyl mercaptan, n-butyl mercaptan, isobutyl mercaptan, t-butyl mercaptan, n-amyl mercaptan, isoamyl mercaptan, t-amyl mercaptan, n-hexyl mercaptan, cyclohexyl mercaptan, n-octyl mercaptan, n-decyl mercaptan, n-dodecyl mercaptan; mercapto carboxylic acids and their esters, such as methyl mercaptopropionate and 3-mercaptopropionic acid; alcohols such as isopropanol, isobutanol, lauryl alcohol and t-octyl alcohol; and halogenated compounds such as carbon tetrachloride, tetrachloroethylene, and tricholoro-bromoethane. Generally from 0 to 10% by weight, based on the weight of the monomer mixture, can be used. The polymer molecular weight may also be controlled by other techniques, such as selecting the ratio of initiator to monomer.

A stabilizing surfactant may be added to one or both of the reaction mixtures to discourage the aggregation of polymeric latex particles. In general, the growing latex particles are stabilized during emulsion polymerization by one or more surfactants such as an anionic or nonionic surfactant, or a mixture thereof. Examples of surfactants suitable for emulsion polymerization are provided in *McCutcheon's Detergents and Emulsifiers* (MC Publishing Co., Glen Rock, N.J.), published annually. Other stabilizing agents, such as protective colloids, may be used.

The first mixture of monomers may be polymerized in the presence of a pre-formed polymer dispersion ("seed" latex), for controlling the desired particle size. Seeds are also typically used for controlling the structure and/or morphology of the resulting polymer. The "seed" latex may comprise small particles, having a mean diameter less than 200 nm, preferably less than 100 nm, and even more preferably less than 65 nm. Typical seed latex particles may have a composition similar to, or different than, the composition of the monomers used in preparing the first stage of the multistage nanocomposite or the first stage of a seeded single stage nanocomposite polymer. The pre-formed polymer dispersion may include polymer particles of a rubbery material, and may be similar or different in composition to the core polymer. The term "rubbery", as used herein, denotes the thermodynamic state of a polymer above its glass transition temperature. Alternatively, the seeds may include hard non-rubbery polymer particles, (e.g., polystyrene or polymethyl methacrylate), which may be used for adjusting refractive index, as taught in Myers et al., U.S. Pat. No. 3,971,835.

The present invention also encompasses nanocomposite polymer particles that are formed in prior polymerization or additional polymerization stages. These stages may occur before, during, or after the formation of the stage containing the clay.

Another process of the present invention involves the gradual addition and polymerization of an aqueous dispersion containing at least one ethylenically unsaturated monomer and layered clay that has been modified by the addition of a second cation to one or more emulsion polymer seeds. In this process, the emulsion polymer seeds preferably have a particle diameter of 20 to 500 nm, more preferably 30 to 400 nm, and even more preferably 40 to 300 nm. The emulsion polymer seeds are from 0.1 to 10%, preferably 0.5% to 8%, even more preferably 1% to 5% based on dry weight of the total polymer weight in said nanocomposite dispersion. While polymer seeds may not typically contain clay, this embodiment further envisions that the polymer seeds may contain up to 20% clay, preferably up to 10% clay, and more preferably up to 5% clay based on dry weight of the total polymer weight in said nanocomposite dispersion.

The aqueous dispersion in this process contains 80 to 99.95%, preferably 85 to 99.9%, and even more preferably from 90 to 99.9% based on dry weight of the total dry polymer weight in the nanocomposite dispersion of at least one ethylenically unsaturated monomer, and 0.05% to 20%, preferably from 0.1% to 15%, and even more preferably from 0.1% to 10%, based on dry weight of total dry polymer weight in said nanocomposite of a layered clay.

After polymerization of each stage it is desirable that at least 95%, preferably at least 97%, and even more preferably at least 99% based on weight of the monomer is polymerized in a reactor before a subsequent polymerization stage is begun.

The emulsion polymer seeds may be formed in the same reactor vessel where the monomers are polymerized and/or prepared in a separate reactor vessel and subsequently introduced to the reactor vessel where the monomers are polymerized. In certain embodiments, the polymer seeds of the aqueous emulsion are formed in the same reaction vessel in which the monomer is polymerized. In these embodiments, the aqueous clay dispersion may comprise up to 200 weight percent based on dry weight of a layered clay. The lower percentage solids within the reactor vessel allows one to add higher clay levels while maintaining a usable viscosity. In an alternative embodiment, the polymer seeds may contain an at least partially exfoliated layered clay. In this embodiment, the amount of clay is in the range of from 0.05% to 20%, preferably from 0.1% to 15%, and even more preferably from 0.1% to 10% based on dry weight of total dry polymer weight in the polymer seeds.

Another process of the present invention involves preparing an aqueous nanocomposite dispersion by admixing an aqueous emulsion polymer and 0.1 to 10%, based on dry weight of said emulsion polymer of a layered clay that has been modified by the addition of a second cation. In this process the aqueous emulsion polymer is preferably prepared according to any of the various known methods of preparing emulsion polymers according to the art of emulsion polymerization. In one embodiment of this process it is preferable that the nanocomposite dispersions are prepared using gradual addition "grad-add" processes. In this embodiment it is also preferable that the nanocomposite polymers are prepared by multi-stage polymerizations, such as core-shell polymer particles having a rubber core and a hard shell.

The admixing step of the modified layered clay in this embodiment is preferably completed without the need for a clay surfactant. In another embodiment, the clay to which the second cation is added, is predispersed in water and admixed with the aqueous emulsion polymer. Any mechanical mixing device may be suitable as long as the clay particles are at least partially exfoliated. More preferably, the clay particles are mixed to uniformly disperse the clay within the nanocomposite dispersion. For example, a COWLES™ mechanical mixer may be used to prepare modified aqueous clay dispersions containing up to 20% clay, however it is more preferable to use a mechanical homogenizer to prepare aqueous clay dispersions containing from 0.1 to 10% clay.

The aqueous nanocomposite clay-polymer dispersions of the present invention may also be prepared utilizing inverse emulsion polymerization. The processes described in, for example, U.S. Pat. Nos. 3,284,393, 3,826,771, 4,745,154, and accompanying references therein, can be utilized incorporating clay and the second cation into the aqueous phase of these polymerizations when used to make an acid containing polymer (high or low levels of acid). Inverse emulsion polymerization methods may yield high molecular weight polymers or copolymers based on the water soluble monomers and mixtures comprised thereof. An aqueous solution of these monomers may be dispersed in an oil phase by means of a water in oil emulsifier and subsequently polymerized under free radical forming conditions.

The aqueous nanocomposite clay-polymer dispersions may be useful, for example, as coatings, sealants, caulks, adhesives, and as plastics additives. The coating compositions comprising aqueous nanocomposite clay-polymer dispersions may exhibit improved properties like block, print and dirt pick-up resistance, enhanced barrier properties, and enhanced flame retardence. Additionally, the coating compositions comprising the aqueous nanocomposites of the present invention may have the ability to utilize softer binders, without the need for additional coalescant (solvents) for film formation, and still maintain sufficient hardness, toughness and lower tack in a dried film. Suitable applications for the coating compositions of the present invention may include architectural coatings (particularly low VOC applications for semi-gloss and gloss); factory applied coatings (metal and wood, thermoplastic and thermosetting); maintenance coatings (e.g., over metal); automotive coatings; concrete roof tile coatings; elastomeric roof coatings; elastomeric wall coatings; external insulating finishing systems; and inks. The aqueous nanocomposite dispersions of the present invention may be useful as additives, dispersants, alkali soluble resins, acid functional thickeners. It is further contemplated that the aqueous nanocomposite dispersions, when provided as an additive to a coating application, may impart hardness. A further application for the aqueous nanocomposite dispersion is for an opaque polymer and hollow sphere pigments. The inclusion of the aqueous nanocomposite dispersions may provide, for example, harder, more collapse resistant shells or may be suitable for the modification of fibers. Yet further non-limiting examples of applications for the aqueous clay-polymer nanocomposite dispersions: polish; binders (such as binders for nonwovens, paper coatings, pigment printing, or ink jet); adhesives (such as pressure sensitive adhesives, flocking adhesives, or other water based adhesives); plastics additives; ion exchange resins; hair fixatives; caulks; and sealants. The aqueous clay-polymer nanocomposite dispersion may impart strength and toughness to the aforementioned applications.

In one embodiment of the present invention, the aqueous nanocomposite dispersions are capable of forming films upon drying (e.g., coatings and adhesives). In this embodiment, it is preferred that the polymers of the nanocomposites have a glass transition temperature in the range of from −80° C. to 50° C. Glass transition temperatures may be calculated by using the Fox equation (see T. G. Fox, Bull. Am. Physics Soc., Vol. 1, Issue No. 3, page 123(1956)).

An additional embodiment of the present invention contemplates preparing a coating composition containing an aqueous nanocomposite dispersion. The coating composition of this invention may include, for example, coating or paint compositions which may be described in the art as architectural coatings, maintenance coatings, factory-applied coatings, automotive coatings, elastomeric wall or roof coatings, exterior insulating finishing system coatings, paper or paperboard coatings, overprint varnishes, fabric coatings and backcoatings, leather coatings, cementitious roof tile coatings, and traffic paints. Alternatively, the coating or paint compositions may be described as clear coatings, flat coatings, satin coatings, semi-gloss coatings, gloss coatings, primers, textured coatings, and the like. In these embodiments, it is preferred that the polymers of the nanocomposites have glass transition temperatures in that ranges from 0° C. to 70° C.

The coating composition of the present invention may further include pigments and/or fillers such as, for example, titanium dioxide, iron oxide, zinc oxide, magnesium silicate, calcium carbonate, organic and inorganic colored pigments, and clays other than layered clay. Such pigmented coating compositions typically contain from 3 to 70% pigment on a volume basis, or more preferably from 15 to 60% titanium dioxide on a volume basis.

The coating composition may be prepared by techniques which are well known in the coatings art. First, optionally, at least one pigment is dispersed within an aqueous medium under high shear such as is afforded by a COWLES™ mixer or, alternatively at least one predispersed pigment may be used. Then, the aqueous nanocomposite dispersion may be added under low shear stirring along with other coatings adjuvants, as desired. Alternatively, the aqueous nanocomposite dispersion may be included in the optional pigment dispersion step. The coating composition may also contain conventional coatings adjuvants such as, for example, tackifiers, emulsifiers, coalescing agents, plasticizers, buffers, neutralizers, thickeners or rheology modifiers, humectants, crosslinking agents including heat-, moisture-, light-, and other chemical- or energy-curable agents, wetting agents, biocides, plasticizers, antifoaming agents, colorants, waxes, water repellants, slip or mar aids, anti-oxidants, and the like. The coating composition, in addition to the aqueous nanocomposite dispersion described herein, may also contain at least one additional polymer, preferably an additional emulsion polymer(s) selected from film-forming and non-film-forming emulsion polymers, including, but not limited to polymeric pigments, such as solid particles, particles having a single void, or multivoided particles. These additional polymers, if added to the coating composition of the present invention, may be present at a level of 0–200%, based on dry weight of the total dry polymer weight in the nanocomposite dispersion.

The solids content of the coating composition may be from 10% to 70% by volume. The viscosity of the coating composition may be from 0.05 to 100 pascal-seconds (Pa.s), or 50 to 100,000 centipoise (cP), as measured using a Brookfield viscometer; the viscosities appropriate for different application methods vary considerably.

The coating composition may applied by conventional application methods such as, for example, brushing and spraying methods such as, for example, roll coating, doctor-blade application, printing methods, air-atomized spray, air-assisted spray, airless spray, high volume low pressure spray, air-assisted airless spray, air knife coating, trailing blade coating, curtain coating, and extrusion.

The coating composition may be applied to a substrate such as, for example, paper or paperboard; consolidated wood products; glass; plastic; wood; metal; primed or previously painted surfaces; weathered surfaces; asphaltic substrates; ceramics; leather; and hydraulic substrates such as cement in 'green' or cured form, concrete, gypsum, and stucco. The coating composition applied to the substrate is typically dried, or allowed to dry, at a temperature from 10° C. to 95° C.

In another embodiment of this invention, an adhesive composition containing an aqueous nanocomposite dispersion is provided. The various components, processes, and uses of the aforementioned coating compositions are preferably applicable to these nanocomposite-containing adhesive compositions.

In another embodiment of this invention, caulking and sealant compositions containing an aqueous nanocomposite dispersion are provided. The various components, processes, and uses of the aforementioned coating compositions are preferably applicable to these nanocomposite-containing caulking and sealant compositions. In addition, caulking and sealant compositions preferably have a paste-like or gel-like consistency and preferably have higher viscosities than do coatings. Accordingly, caulks and sealants can be prepared using the aqueous nanocomposite dispersions of the present invention according to the general formulations known in the art of preparing caulks and sealants from emulsion polymers. In this embodiment, caulks and sealants can be prepared by blending fillers with the aqueous nanocomposite dispersions according to methods known in the art.

In some embodiments of this invention, the aqueous nanocomposite dispersions desirably form films upon drying, with or without the addition of plasticizers or coalescents (e.g., coatings and adhesives). In these embodiments, it is preferred that the polymers of the nanocomposites have glass transition temperatures in the range of from −80° C. to 100° C.

In another embodiment of this invention, an adhesive composition containing an aqueous nanocomposite dispersion is contemplated. The adhesive compositions may include, for example, those known in the art as pressure sensitive adhesives, laminating adhesives, packaging adhesives, hot melt adhesives, reactive adhesives, flocking adhesives, and flexible or rigid industrial adhesives. In these embodiments it is preferred that the polymers of the nanocomposites have glass transition temperatures in the range of from −80° C. to 80° C. The adhesives are typically prepared by admixing optional pigment and the optional adjuvants listed herein above as coatings adjuvants. The adhesive compositions are typically applied to substrates including plastic substrates such as film, sheet, and reinforced plastic composites; metal foil; fabric; metal; glass; cementitious substrates; and wood or wood composites. Application to the substrates is typically effected on machine by transfer roll coater, e.g., or by manual application devices.

In another embodiment of this invention, a caulk or sealant composition containing an aqueous nanocomposite dispersion is contemplated. In these embodiments it is preferred that the polymers of the nanocomposites have glass transition temperatures in the range of from −80° C. to 0° C. The caulk or sealant compositions are typically prepared by admixing pigment and such optional adjuvants listed hereinabove as coatings adjuvants as are appropriate. The caulk and sealant compositions are typically prepared at high solids content level such as 70 wt. % and above in order to minimize shrinkage on drying and consequently, may have a gel-like or paste-like consistency. Caulk and sealant compositions are typically applied to fill and/or seal junctions of substrates including metal; glass; cementitious substrates; wood or wood composites; and combinations thereof and are typically allowed to dry under ambient conditions.

In another embodiment of this invention, an ink composition containing an aqueous nanocomposite dispersion is contemplated. The ink compositions may include, for example, those known in the art as flexographic inks, gravure inks, ink jet inks, and pigment printing pastes. In these embodiments it is preferred that the polymers of the nanocomposites have glass transition temperatures in the range of from −50° C. to 50° C. The inks are typically prepared by admixing optional pigment, predispersed pigment, or dyes and the optional adjuvants listed herein above as coatings adjuvants. The ink compositions are typically applied to substrates including plastic substrates such as film, sheet, and reinforced plastic composites; paper or paperboard; metal foil; fabric; metal; glass; cloth; and wood or wood composites. Application to the substrates is typically effected on machine by flexographic blankets, gravure rolls, silk screens.

In a further aspect of the present invention, a digital imaging composition incorporating an aqueous nanocomposite dispersion and/or nanocomposite particles is contemplated. The term "digital imaging" as used herein generally relates to compositions that allow the reproduction of an image onto a substrate. Suitable applications for digital imaging compositions include toners for electrophotography such as xerography or compositions for ink jet printers or similar applications. The Tg and particle size for digital imaging compositions varies depending upon its method or system of use. Generally, digital imaging compositions for ink jet applications may have a lower particle size and Tg compared to the particle size and Tg for digital imaging compositions for electrophotography applications. For example, typical Tg values for ink jet applications may range from 45° C. to 60° C. whereas Tg values for electrophotography applications may range from 55° C. to 85° C. Further, non-limiting variables such as viscosity, surface tension, and pH of the digital imaging composition may also be adjusted based upon the end use of the composition.

In another embodiment of this invention, a nonwoven fabric binder containing an aqueous nanocomposite dispersion is contemplated. The nonwoven binder compositions may include, for example, those known in the art as binders for consumer and industrial nonwovens such as wipes and interlining, binders for insulating nonwovens such as fiber-fill and fiberglass, and binders/strengthening agents for nonwovens and paper such as oil filter paper. In these embodiments it is preferred that the polymers of the nanocomposites have glass transition temperatures in the range of from −60° C. to 50° C. The nonwoven fabric binders are typically prepared by admixing optional pigment, and the optional adjuvants listed herein above as coatings adjuvants, as appropriate. The nonwoven fabric binder compositions are typically applied to substrates including nonwovens formed from cellulosic fibers such as paper and rayon; synthetic fibers such as polyester, aramid, and nylon; glass fibers and mixtures thereof. Application to the substrates is typically effected on machine by saturation bath, roll coater, spray, or the like.

In another embodiment of this invention, a polish containing an aqueous nanocomposite dispersion is contemplated. The polish compositions may include, for example, those known in the art as floor polishes, furniture polishes, and automobile polishes. In these embodiments it is preferred that the polymers of the nanocomposites have glass transition temperatures in the range of from 0° C. to 50° C. The polishes are typically prepared by admixing optional pigment, and the optional adjuvants listed herein above as coatings adjuvants, as appropriate, particularly waxes. The polish compositions are typically applied to substrates including wood, vinyl or polyurethane flooring, ceramic tiles, painted metal, and the like. Application to the substrates is typically effected by spray, roller, mop, or the like.

In another embodiment of this invention, a plastics additive containing an aqueous nanocomposite dispersion is contemplated. The plastics additive compositions may include, for example, those known in the art as processing aids and impact modifiers. In these embodiments it is preferred that the polymers of the nanocomposites have glass transition temperatures in the range of from −50° C. to 50° C. The plastics additives are typically prepared by admixing optional pigment, and the optional adjuvants listed herein above as coatings adjuvants, as appropriate, and, typically, drying the composition to a powdered form. The plastics additives compositions are typically mixed with the plastic such as, for example, polyvinyl chloride, polymethyl methacrylate and polypropylene, by milling or extrusion.

In another aspect of the present invention the emulsion polymer of the nanocomposite may be prepared by a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged emulsion polymer may contain the same monomers, surfactants, chain transfer agents, etc. as disclosed herein-above for the emulsion polymer. In the case of a multi-staged polymer particle the Tg for the purpose of this invention is to be calculated by the Fox equation using the overall composition of the emulsion polymer without regard for the number of stages or phases therein. The polymerization techniques used to prepare such multistage emulsion polymers are well known in the art such as, for example, U.S. Pat. Nos. 4,325,856; 4,654,397; and 4,814,373.

In other aspects of the present invention the emulsion polymer of the nanocomposite may be prepared by an emulsion polymerization process which is executed in such a manner to produce a bimodal or mutimodal particle size distribution as is taught in U.S. Pat. Nos. 4,247,438; 4,657, 966; and 5,498,655, a bimodal or multimodal molecular weight distribution as is taught in U.S. Pat. Nos. 4,501,845 and 5,990,228 , or non spherical particles such as, for example, rods as are taught in U.S. Pat. No. 5,369,163 and multilobal particles as are taught in U.S. Pat. No. 4,791,151.

In another aspect of the present invention the emulsion polymer of the nanocomposite may be prepared by a process which produces particles which when dry contain at least one void such as, for example, particles having a single void, multivoided particles, and particles having interpenetrating networks of void and polymer (polymer "sponge").

In another aspect of the present invention the emulsion polymer of the nanocomposite may be prepared by a process which produces particles which may function in a manner instead of or in addition to providing binder functionality. Contemplated are emulsion polymers which function as pigment dispersants or thickeners/rheology modifiers such as alkali-soluble, acid-soluble, and hydrophobically-modified emulsion polymers.

In certain aspects of the present invention, the aqueous nanocomposite dispersions may be used in polymer compositions incorporating high levels of acid functionality. These polymer compositions are useful as additives in water based systems as thickeners (see, for example, U.S. Pat. No. 4,421,902 and references therein), dispersants (see, for example, U.S. Pat. Nos. 5,326,843 and 3,037,952 and references therein) and binders (see, for example, U.S. Pat. Nos. 5,326,843 and 4,876,313 and references therein) as well as coatings, inks, adhesives and the like. When the nanocomposite compositions prepared in accordance with the method of the present invention are incorporated into high acid polymer compositions, the resultant polymer may increase in hardness. This imparts properties such as enhanced block resistance (i.e., the coating will not stick to itself or other items) when used in a paint composition. Ink binders, that are comprised entirely or partially of high acid polymers, will exhibit enhanced heat seal resistance (block resistance at elevated temperature) and toughness when the nanocomposite compositions are added to the binder composition. In yet another embodiment utilizing high acid polymers, the nanocomposite compositions of the present invention may be used as dry powder polymer cement modifiers (such as described in, for example, EP0654454 and references therein).

EXAMPLES

Example 1
(2% Clay with Calcium/MAA/$Na_2CO_3$ Addition Order—No Homogenization)

An aqueous nanocomposite, clay polymer dispersion was synthesized via the following method: an empty reactor kettle was charged with 612.00 g deionized ("DI") water, 5.08 g polar surfactant (30% aqueous solution), and 20.40 g PGV montmorillonite clay ($Na^+$ form) ("PGV" is the trade name for a sodium montmorillonite clay sold by Nanocor, Arlington Heights, Ill.). The mixture was heated to 85° C. and then a 1.84 g quantity of $Ca(OH)_2$ in 5.00 g DI water was added. The kettle was charged with half of the acid containing monomer, or 7.55 g methacrylic acid, followed by 3.10 g of a buffer, sodium carbonate, whereupon foaming was observed. In a separate vessel, a monomer emulsion was formed containing 426.60 g water, 36.90 g polar surfactant (30% aqueous solution), 662.00 g Butyl Acrylate, 342.70 g Methyl Methacrylate, and 7.55 g methacrylic acid. A 55.80 g quantity of the monomer emulsion was added to the kettle to form a polymer seed. Then, 4.03 g ammonium persulfate (dissolved in 28 g water) was added to initiate polymerization. The monomer emulsion was fed into the kettle such that a reactor temperature of 85° C. was maintained. After monomer feeds were completed, the batch was cooled to 65° C. Upon reaching 65° C., the kettle was charged with 5.58 g ferrous sulfate (0.15% aqueous). Then, a 1.12 g quantity of 70% tert-butyl hydroperoxide in 20.00 g of water was added along with a 0.56 g quantity of isoascorbic acid in 20.00 g water. The temperature was reduced to below 45° C. The pH of the batch was raised to 7.5 using ammonium hydroxide (28% aqueous) and a bactericide (4.77 g KATHON LX (1.4% aqueous), manufactured by with 6.20 g water) was added. The viscosity of the resultant aqueous nanocomposite dispersion was 174 centipoise. The viscosity of the aqueous nanocomposite dispersion is lower in comparison to aqueous nanocomposite dispersions that include the step of cation exchange or are not modified (see supra Example 8). The sample was filtered through a 100 mesh screen to remove any large pieces of coagulated material.

Example 2
(2% Clay with Calcium/MAA/$Na_2CO_3$ Addition Order—with Homogenization)

An aqueous nanocomposite dispersion was prepared according to the polymerization method of Example 1 except that the kettle contents (clay, surfactant, water) were homogenized for 20 minutes using a PRO250 homogenizer (manufactured by Pro Scientific of Monroe, Conn.).

Example 3
(2% Clay with MAA/Calcium/$Na_2CO_3$ Addition Order)

An aqueous nanocomposite dispersion was prepared according to the polymerization method of Example 1 except that half of the acid containing monomer, or 7.55 g of methacrylic acid, was charged prior to the addition of the 1.84 g quantity of $Ca(OH)_2$ in 5.00 g DI water.

Example 4
(2% clay with MAA/Calcium/$Na_2CO_3$ Addition Order—with Homogenization)

An aqueous nanocomposite dispersion was prepared according to the polymerization method of Example 2 except that half of the acid containing monomer, or 7.55 g of methacrylic acid, was charged, prior to the addition of the 1.84 g quantity of $Ca(OH)_2$ in 5.00 g DI water.

Example 5
(2% Clay with MAA—$Na_2CO_3$ Addition; $Ca^{2+}$ Post-addition)

An aqueous nanocomposite dispersion was synthesized via the following method: an empty reactor kettle was charged with 612.00 g DI water, 5.08 g polar surfactant (30% aqueous solution), and 20.40 g montmorillonite clay (Na+ form). The mixture was heated to 85° C. The kettle was then charged with 7.55 g of methacrylic acid which was followed by 3.10 g sodium carbonate (foaming was observed). In a separate vessel, a monomer emulsion was formed containing 426.60 g water, 36.90 g polar surfactant (30% aqueous solution), 662.00 g Butyl Acrylate, 342.70 g Methyl Methacrylate, and 7.55 g methacrylic acid. A 55.80 g quantity of the monomer emulsion was added to the kettle to form a polymer seed. Then, 4.03 g ammonium persulfate (dissolved in 28 g water) was added to initiate polymerization. The monomer emulsion was fed into the kettle such that a reactor temperature of 85° C. was maintained. After monomer feeds were completed, the batch was cooled to 65° C., and upon reaching 65° C. 5.58 g ferrous sulfate (0.15% aqueous) was added to the reactor. Then, a 1.12 g quantity of 70% tert-butyl hydroperoxide in 20.00 g of water was added along with a 0.56 g quantity of isoascorbic acid in 20.00 g water. The temperature was reduced to below 45° C. The pH of the batch was raised to 7.5 using ammonium hydroxide (28% aqueous) and a bactericide (4.77 g Kathon LX (1.4% aqueous) with 6.20 g water) was added. The sample was filtered through a 100 mesh screen to remove any large pieces of coagulated material. A 1.84 g quantity of $Ca(OH)_2$ in 5.00 g DI water was added slowly to the latex.

Example 6
(No Clay with MAA—$Na_2CO_3$ Addition; $Ca^{2+}$ Post-addition)

A latex was prepared according to the polymerization method of Example 4 except that no clay was included in the run.

Example 7
(No Clay or $Ca^{2+}$ Added)

A latex was prepared according the polymerization method of Example 5 except that no calcium post-addition was included in the run. Further, the entire methacrylic acid charge was incorporated into the monomer emulsion.

Example 8
(2% PGV; No $Ca^{2+}$ Added)

An aqueous nanocomposite dispersion was prepared according the polymerization method of Example 6 with the exception that 2% PGV clay (by weight based of monomer) was incorporated into the monomer emulsion and homogenized for 20 minutes prior to the polymerization. The viscosity of the resultant aqueous nanocomposite dispersion was 480 centipoise. The viscosity of the aqueous nanocomposite dispersion was higher in comparison to aqueous nanocomposite dispersions that include the step of cation exchange or are modified (see infra Example 1).

The nanocomposites or polymers of Examples 1 through 8 were made into sample films of unformulated coatings and tested for the tensile properties of maximum tensile strength and percentage elongation. The test date for each film were collected on a Tinius Olsen Benchtop Universal Testing Machine (manufactured by Tinius Olsen Testing Machine Company, Willow Grove, Pa.). The sample films were pulled at a rate of 5.08 cm/min. The testing machine was calibrated for the film thickness, width, and weight of each sample film. The initial distance between the clamps holding each sample film was 2.54 cm. The testing was conducted in a controlled environment room at a temperature of 22° C. and a humidity level of 50%. The tensile measurements for each film are provided in the following Table I.

TABLE I

Tensile Properties Versus Method of Clay Addition

| Example | Clay Level & Type | Homogenization | Calcium | $Tensile_{max}$[1]/ Elongation |
|---|---|---|---|---|
| 1 | 2% PGV | N | Y | 416 psi/1045% |
| 2 | 2% PGV | Y | Y | 413 psi/1059% |
| 3 | 2% PGV | Y | Y | 253 psi/1110% |
| 4 | 2% PGV | N | Y | 252 psi/1099% |
| 5 | 2% PGV | N | Y | 128.5 psi/1294% |

TABLE I-continued

Tensile Properties Versus Method of Clay Addition

| Example | Clay Level & Type | Homogenization | Calcium | $Tensile_{max}$[1]/ Elongation |
|---|---|---|---|---|
| 6 | No clay | N | Y | 94.9 psi/1272% |
| 7 | No clay | N | N | 59 psi/1040% |
| 8 | 2% PGV | Y | N | 81.5 psi/1239% |

[1]$Tensile_{max}$ values are +/− 3 psi. Samples are not averaged.

As the results in Table I illustrate, the addition of the second cation, or the multivalent ion slurry containing $Ca^{2+}$, improved the overall tensile properties, and almost doubled the maximum tensile strength, of the composition regardless of whether the composition contained clay (compare Example 7 with Example 6). Similarly, the addition of the multivalent ion slurry containing $Ca^{2+}$ to a clay-containing composition, or nanocomposite dispersion, also greatly improved the overall tensile properties of the nanocomposite (compare Example 8 with 3). In some embodiments of the present invention such as in Example 1, the maximum tensile strength of the nanocomposite is roughly 5.5 times that of the same polymer with no clay and no addition of the $Ca^{2+}$ slurry such as Example 7.

Figure 1:
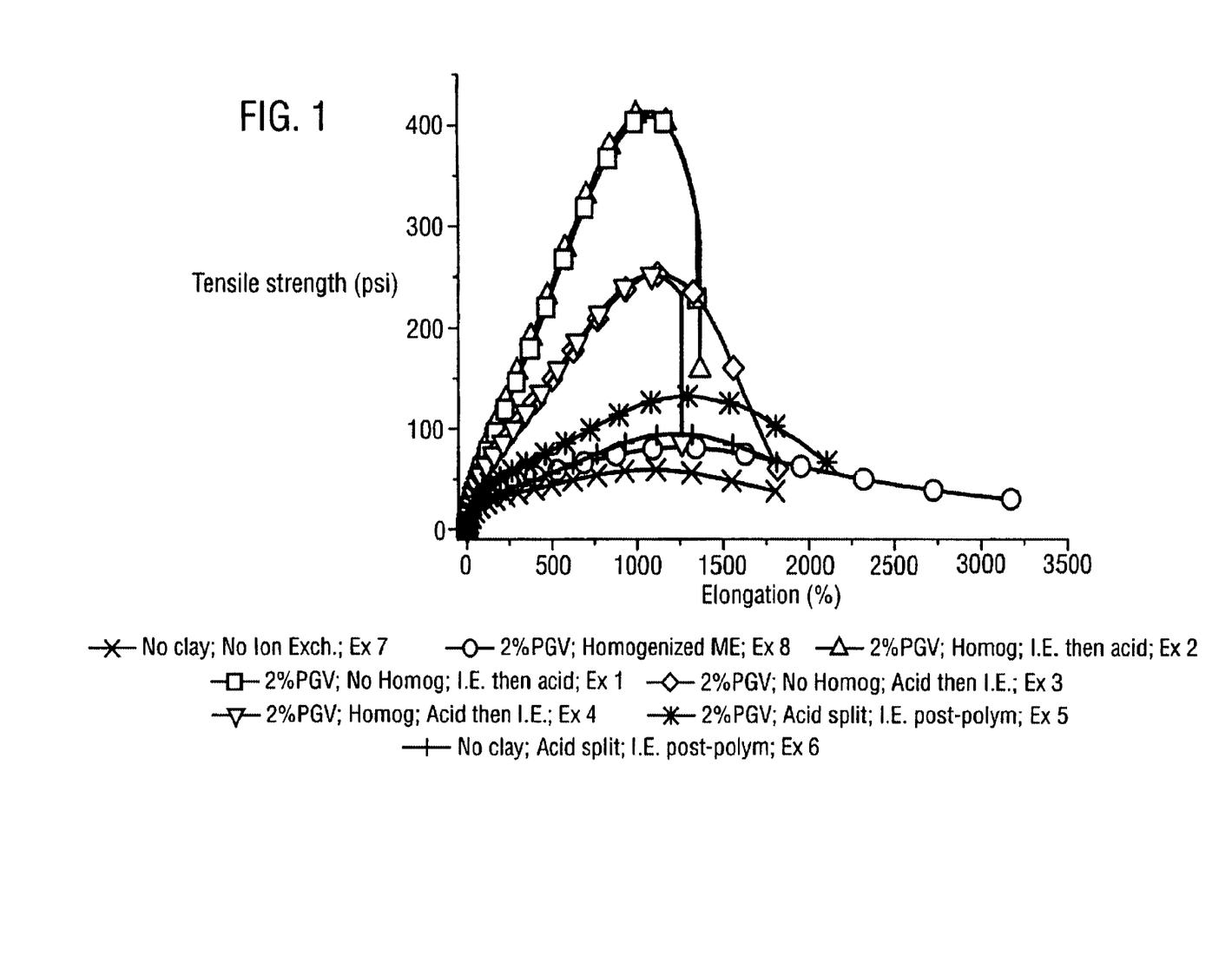

FIG. 1 provides a graphical representation of tensile strength (psi) vs. percentage of elongation for the various polymer or nanocomposite compositions of Table I. As FIG. 1 illustrates, the inclusion of both the clay and second cation in the form of a $Ca^{2+}$ slurry resulted in a much higher modulus material than polymers lacking one or both of these constituents as evidenced by the higher initial slope of the strength/elongation curve.

Example 9

Figure 2:
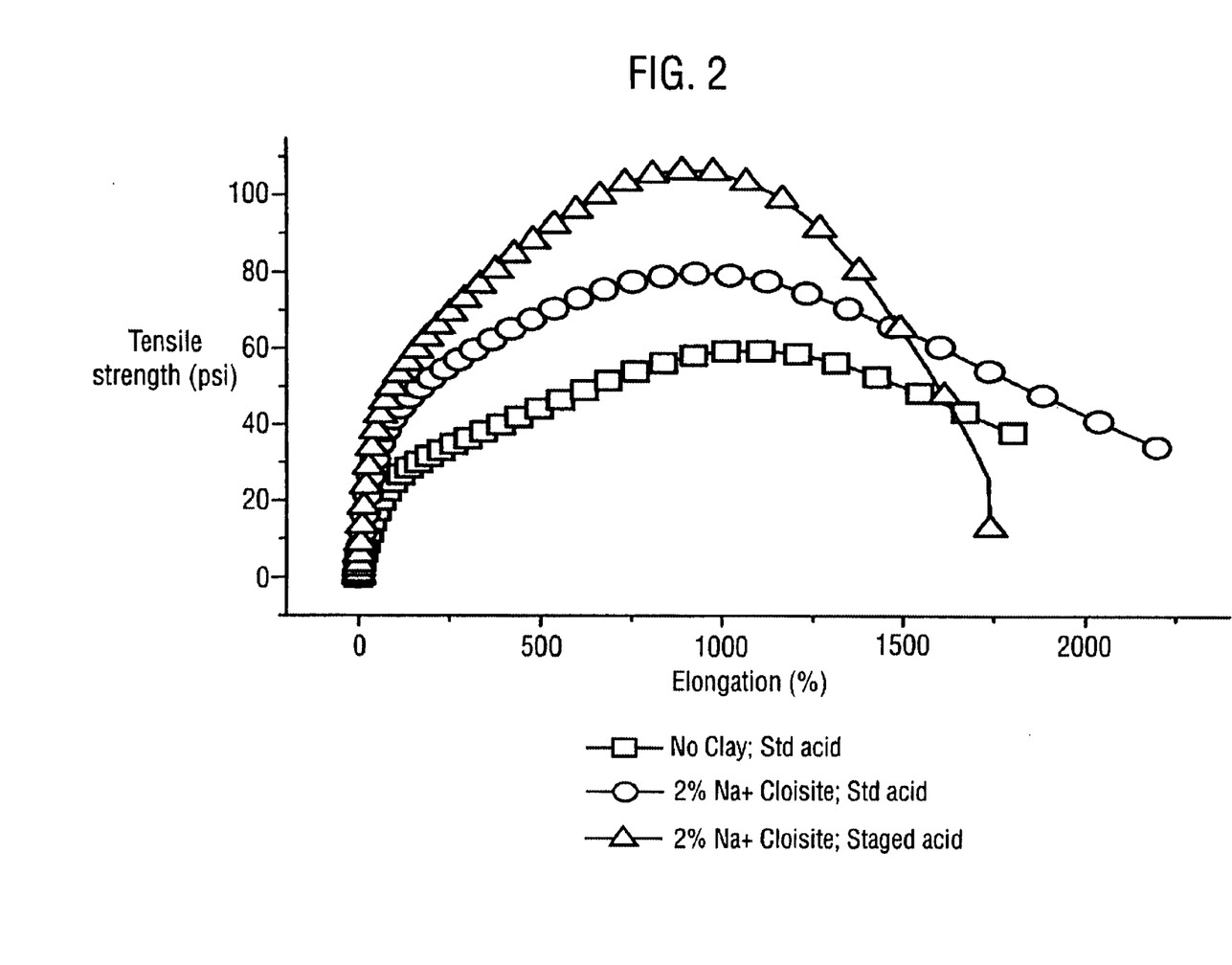

An emulsion based polymer composition and two nanocomposite compositions comprising the same polymer and $Na^{2+}$ cloisite clay were prepared in accordance with the methods of the present invention. "Sodium cloisite" is the trade name for a sodium montmorillonite clay available from Southern Clay Products, of Gonzales, Tex. FIG. 2 provides a graphical representation of tensile strength (psi) vs. percentage of elongation for these compositions. The nanocomposite compositions depicted in FIG. 2 varied in the order of adding the polymerizable polar monomer or acid. In FIG. 2, the nanocomposite represented by the circle and the polymer represented by a square reflected a standard acid addition, i.e., all of the polymerizable acid is added to the monomer emulsion. By contrast, the nanocomposite represented by the triangle represented a staged acid approach in which half of the acid is added to the clay dispersion and half of the acid is added to the monomer emulsion. As FIG. 2 illustrates, the nanocomposite in which the acid was staged had a much higher modulus than the polymer or nanocomposite which followed the standard acid addition approach.

Example 10

Magnesium Example (2% Clay with Magnesium/ MAA/Na2CO3 Addition Order—No Homogenization)

An aqueous nanocomposite dispersion was synthesized via the following method: an empty reactor kettle was charged with 612.00 g DI water, 5.08 g polar surfactant (30% aqueous solution), and 20.40 g montmorillonite clay (Na+ form). The mixture was heated to 85° C. and then a 1.45 g quantity of Mg(OH)$_2$ in 5.00 g DI water was added. The kettle was then charged with 7.55 g of methacrylic acid which was followed by 3.10 g sodium carbonate (foaming was observed). In a separate vessel, a monomer emulsion was formed containing 426.60 g water, 36.90 g anionic surfactant (30% aqueous solution), 662.00 g Butyl Acrylate, 342.70 g Methyl Methacrylate, and 7.55 g methacrylic acid. A 55.80 g quantity of the monomer emulsion was added to the kettle to form a polymer seed. Then, 4.03 g ammonium persulfate (dissolved in 28 g water) was added to initiate polymerization. The monomer emulsion was fed into the kettle such that a reactor temperature of 85° C. was maintained. After monomer feeds were completed, the batch was cooled to 65° C., and upon reaching 65° C., 5.58 g ferrous sulfate (0.15% aqueous) was added to the reactor. Then, a 1.12 g quantity of 70% tert-butyl hydroperoxide in 20.00 g of water was added along with a 0.56 g quantity of isoascorbic acid in 20.00 g water. The temperature was reduced to below 45° C. The pH of the batch was raised to 7.5 using ammonium hydroxide (28% aqueous) and a bactericide (4.77 g Kathon LX (1.4% aqueous) with 6.20 g water) was added. The sample was filtered through a 100 mesh screen to remove any large pieces of coagulated material.

Example 11
(5% Clay with Calcium/MAA/Na$_2$CO$_3$ Addition Order)

An aqueous nanocomposite dispersion was prepared according to the polymerization method of Example 1 except that the 5% PGV clay was used. The nanocomposites or polymers of Example 11 was made into a sample film of an unformulated coating and tested for the tensile properties of maximum tensile strength in accordance with the methods used in Table I and FIG. 1. The resultant tensile strength was 506 psi. The viscosity of the aqueous nanocomposite dispersion was 294 centipoise. The viscosity of the aqueous nanocomposite dispersion was lower in comparison to aqueous nanocomposite dispersions that do include the step of cation exchange or are not modified (see supra Example 12).

Example 12
(5% PGV; No Ca$^{2+}$ Added)

An aqueous nanocomposite dispersion was prepared according to the polymerization method of Example 8 except that the 5% PGV clay was used. The nanocomposites or polymers of Example 12 was made into a sample film of an unformulated coating and tested for the tensile properties of maximum tensile strength in accordance with the methods used in Table I and FIG. 1. The resultant tensile strength was 108.7 psi. The viscosity of the aqueous nanocomposite dispersion was 2300 centipoise. The viscosity of the aqueous nanocomposite dispersion was higher in comparison to aqueous nanocomposite dispersions that include the step of cation exchange or are modified (see infra Example 11).

Reference Example 13

A latex was synthesized via the following method: To an empty reactor kettle was added 436.00 g DI water, 5.08 g anionic surfactant (30% aqueous solution), and 3.10 g sodium carbonate. A monomer emulsion was formed containing 626.60 g water, 36.90 g anionic surfactant (30% aqueous solution), 654.67 g Butyl Acrylate, 350.00 g Methyl Methacrylate, and 15.10 g methacrylic acid. The kettle contents were heated to 85° C. A 55.80 g quantity of the monomer emulsion was added to the kettle to form a polymer seed. Then, 4.03 g ammonium persulfate (dissolved in 28 g water) was added to initiate polymerization. The monomer emulsion was fed into the kettle such that a reactor temperature of 85° C. was maintained. After monomer feeds were completed, the batch was cooled to 65° C., and upon reaching 65° C. 5.58 g ferrous sulfate (0.15% aqueous) was added to the reactor. Then, a 1.12 g quantity of 70% tert-butyl hydroperoxide in 20 g of water was added along with a 0.56 g quantity of isoascorbic acid in 20.00 g water. The temperature was reduced to below 45° C. The pH of the batch was raised to 7.5 using ammonium hydroxide (28% aqueous) and a bactericide (4.77 g Kathon LX (1.4% aqueous) with 6.20 g water) was added. The sample was filtered through a 100 mesh screen to remove any large pieces of coagulated material.

Example 14
(2% Clay with Calcium/MAA/Na$_2$CO$_3$/Na$_2$S$_2$O$_4$ Addition Order)

An aqueous nanocomposite dispersion was prepared according to the polymerization method of Example 11 except that a sufficient quantity of the reductant sodium hydrosulfite was added, in an aqueous solution, to the reactor to reduce all of the iron within the clay sample kettle to the Fe$^{II}$ form. The contents of the reactor were stirred for 10 minutes after the addition of the reductant solution; a color change to green/gray was observed which was indicative of iron reduction. The resulting nanocomposite was made into sample film of an unformulated coating and tested for the tensile properties of maximum tensile strength in accordance with the methods used in Table I and FIG. 1. The resultant tensile strength was 44.0 psi. The viscosity of the aqueous nanocomposite dispersion was 428 centipoise. The viscosity of the aqueous nanocomposite dispersion was lower in comparison to aqueous nanocomposite dispersions that include the step of cation exchange or are not modified (see supra Example 12).

Example 15
(5% Clay with Calcium/MAA/Na$_2$CO$_3$/Na$_2$S$_2$O$_4$ Addition Order)

An aqueous nanocomposite, clay polymer dispersion is synthesized via the following method: an empty reactor kettle is charged with 612.00 g deionized ("DI") water, 5.08 g polar surfactant (30% aqueous solution), and 20.40 g PGV sodium montmorillonite clay (Na$^+$ form). The mixture is heated to 85° C. and then a 1.84 g quantity of Ca(OH)$_2$ in 5.00 g DI water is added. The kettle is charged with half of the acid containing monomer, or 7.55 g methacrylic acid, followed by 3.10 g of a buffer, sodium carbonate, whereupon foaming is observed. In a separate vessel, a monomer emulsion is formed containing 426.60 g water, 36.90 g polar surfactant (30% aqueous solution), 662.00 g Butyl Acrylate, 342.70 g Methyl Methacrylate, and 7.55 g methacrylic acid. A 55.80 g quantity of the monomer emulsion is added to the kettle to form a polymer seed. Then, 4.03 g ammonium persulfate (dissolved in 28 g water) is added to initiate polymerization. Through three spatially separated inlets, the monomer emulsion is fed into the kettle along with an aqueous solution of 2.0 g of 70% tert-butyl hydroperoxide in 40 g of water and 2 g of isoascorbic acid in 40 g of water such that a reactor temperature of 65° C. was maintained. After monomer feeds are completed, 5.58 g ferrous sulfate (0.15% aqueous) is added to the reactor. Then, a 1.12 g quantity of 70% tert-butyl hydroperoxide in 20.00 g of water is added along with a 0.56 g quantity of isoascorbic acid in 20.00 g water. The temperature is reduced to below 45° C. The pH of the batch is raised to 7.5 using ammonium hydroxide (28% aqueous) and a bactericide (4.77 g KATHON LX (1.4% aqueous), manufactured by with 6.20 g water) is added.

We claim:

1. A process for preparing an aqueous nanocomposite dispersion, wherein the process comprises:
    providing at least one first ethylenically unsaturated monomer;
    providing an aqueous clay dispersion comprising an at least partially exfoliated clay and, optionally, at least one second ethylenically unsaturated monomer, wherein said clay has a first exchangeable cation;
    adding a multivalent second cation to said aqueous clay dispersion, wherein at least a portion of the second cation exchanges with at least a portion of the first cation to form a modified aqueous clay dispersion;
    combining the first ethylenically unsaturated monomer and the modified aqueous clay dispersion; and
    polymerizing at least a portion of said first or second monomer to form said aqueous nanocomposite dispersion wherein at least one of the first or the second ethylenically unsaturated monomer comprises a polar monomer.

2. The process of claim 1 wherein either the first or the second at least one ethylenically unsaturated monomer is polymerized prior to the adding step.

3. The process of claim 1 wherein either the first or the second at ethylenically unsaturated monomer is polymerized after the adding step.

4. The process of claim 1 wherein said polar monomer comprises an acid containing monomer.

5. The process of claim 4 wherein 50% by weight or less of the acid containing monomer is present within the aqueous clay dispersion and the remainder of the acid containing monomer is present in either the first aqueous reaction mixture or the second emulsified monomer mixture.

6. The process of claim 5 wherein 25% by weight or less of the acid containing monomer is present within the aqueous clay dispersion and the remainder of the acid containing monomer is present in either the first aqueous reaction mixture or the second emulsified monomer mixture.

7. The process of claim 4 wherein said acid containing monomer is selected from the group consisting of methacrylic anhydride, maleic anhydride, itaconic anhydride, acrylic acid, methacrylic acid, itaconic acid, maleic acid, fumaric acid, acryloxypropionic acid, (meth) acryloxypropionic acid, styrene sulfonic acid, ethylmethacrylate-2-sulphonic acid, 2-acrylamido-) 2-methylpropane sulphonic acid; phosphoethylmethacrylate; the corresponding salts of the acid containing monomer, and combinations thereof.

8. The process of claim 1 wherein said polar monomer comprises a polar oligomer.

9. The process of claim 1 wherein said polar monomer comprises a low molecular weight, polymeric stabilizer.

10. The process of claim 1 wherein the aqueous clay dispersion has a clay concentration in the range of from 0.1 to 20 weight percent, based on the weight of the monomer within the nanocomposite dispersion.

11. The process of claim 1 wherein the clay is selected from the group consisting of smectite, phyllosilicate, montmorillonite, saponite, beidellite, montronite, hectorite, stevensite, vermiculite, kaolinite, hallosite, synthetic phyllosilicates, and combinations thereof.

12. The process of claim 1 wherein the multivalent second cation comprises at least one divalent or trivalent cation.

13. The process of claim 1 wherein at least a portion of the first exchangeable cation are monovalent cations.

14. The process of claim 1 wherein at least a portion of the first exchangeable cation are sodium or potassium cations.

15. The process of claim 1 wherein the clay is at least partially hydrophobically modified by surfactant.

16. The process of claim 15 wherein at least a portion of the first cation are surfactant cations.

17. The process of claim 1 wherein the polymer in the aqueous clay polymer nanocomposite dispersion is water insoluble.

18. The process of claim 1 wherein said polymerizatinn comprises emulsion polymerization.

19. The process of claim 1 wherein said polymerization comprises solution polymerization.

20. The process of claim 1 wherein said polymerization comprises suspension polymerization.

21. The process of claim 1 wherein said polymerization comprises mini-emulsion polymerization.

22. The process of claim 1, wherein the clay dispersion comprises a redox-active multivalent metal ion.

23. The process of claim 22, wherein an oxidant is added to the clay dispersion.

24. The process of claim 22, wherein a reductant is added to the clay dispersion.

25. The process of claim 22, wherein an oxidant and reductant are added to the clay dispersion.

* * * * *